United States Patent
van Rensburg

(10) Patent No.: US 9,420,013 B1
(45) Date of Patent: Aug. 16, 2016

(54) METHOD, DEVICE AND SYSTEM FOR PROVIDING HISTORICAL COMMUNICATION CONTENT

(71) Applicant: RingCentral, Inc., San Mateo, CA (US)

(72) Inventor: Christopher van Rensburg, Foster City, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 14/747,722

(22) Filed: Jun. 23, 2015

(51) Int. Cl.
*H04L 1/00* (2006.01)
*H04L 29/06* (2006.01)

(52) U.S. Cl.
CPC .......... *H04L 65/1093* (2013.01); *H04L 63/101* (2013.01); *H04L 65/403* (2013.01)

(58) Field of Classification Search
CPC ......... H04L 67/10; H04L 29/08; H04L 29/06; H04L 29/08072; H04L 12/581; G06Q 10/10
USPC ........................... 370/259–270; 709/204–206
See application file for complete search history.

(56) References Cited

U.S. PATENT DOCUMENTS

| 2004/0068524 A1* | 4/2004 | Aboulhosn ....... G06F 17/30206 |
| 2005/0091289 A1* | 4/2005 | Shappell ........... G06F 17/30067 |
| 2014/0280602 A1 | 9/2014 | Quatrano |

* cited by examiner

*Primary Examiner* — Dady Chery
(74) *Attorney, Agent, or Firm* — Finnegan, Henderson, Farabow, Garrett & Dunner, LLP

(57) ABSTRACT

A communication server is disclosed. The communication server may receive, via at least one network interface, a request to add one or more new participants to a communication group; receive, from one or more members of the communication group, one or more selections indicating one or more selected portions of communication content for providing to the one or more new participants, wherein the communication content includes information transferred between a plurality of participants of the communication group prior to the one or more new participants being added to the communication group; determine, based on the one or more selections, a portion of the communication content for providing to the one or more new participants; and provide, via the at least one network interface, the portion of the communication content to one or more user devices associated with the one or more new participants.

18 Claims, 20 Drawing Sheets

METHOD, DEVICE AND SYSTEM FOR PROVIDING HISTORICAL COMMUNICATION CONTENT

TECHNICAL FIELD

The present disclosure relates to the field of communication devices and systems and, more particularly, methods, devices and systems for providing historical communication content.

BACKGROUND

In a group communication environment, such as a collaboration platform, a chat application, a social network application, etc., at a certain point in an ongoing group communication, a member of the group may wish to invite new participants to the communication after a communication thread has already been accumulated. To provide historical communication content to the newly added participants, an original participant may manually resend the historical communication content (thread) to each of the newly added participants, or repeat the prior communication among the group participants after the new participants join the group.

The process of providing prior communication content to new participants could be cumbersome especially when the amount of historical communication is substantial and when new participants continually join the group at different stages of the group communication. Moreover, when an original participant resends the prior communication content to the new participants, other original participants in the group may not be aware of this decision to provide historical group communication content, and may not have the opportunity to deny or edit the information supplied to the new participants. As a result, historical communication content may be provided to the new participants even though some participants in the group may disapprove or prefer to make edits to the content before it is provided to the new participants.

SUMMARY

In one disclosed embodiment, a communication server is disclosed. The communication server comprises at least one network interface and at least one processor in communication with the network interface. The at least one processor is configured to receive a request to add one or more new participants to a communication group; receive, from one or more members of the communication group, one or more selections indicating one or more selected portions of communication content for providing to the one or more new participants, wherein the communication content includes information transferred between a plurality of participants of the communication group prior to the one or more new participants being added to the communication group; determine, based on the one or more selections, a portion of the communication content for providing to the one or more new participants; and provide the portion of the communication content to one or more communication devices associated with the one or more new participants.

In another disclosed embodiment, a user device is disclosed. The user device comprises a display and at least one processor. The at least one processor is configured to receive a first user input indicating a request to add one or more new participants to a communication group; in response to the request, provide at least one selectable element on the display, the at least one selectable element being associated with a portion of communication content for providing to the one or more new participants, wherein the communication content includes information transferred between a plurality of participants of the communication group prior to the one or more new participants being added to the communication group; receive a second user input indicating a selected portion of the communication content for providing to the one or more new participants; and output an indication indicating the selected portion of the communication content for providing to the one or more new participants.

In another disclosed embodiment, a user device is disclosed. The user device comprises at least one communication interface and at least one processor in communication with the communication interface. The at least one processor is configured to receive, via the at least one communication interface, a notification that one or more new participants are added to a communication group; receive, via the at least one communication interface, an indication inquiring whether a first selected portion of communication content for providing to the one or more new participants is acceptable, wherein the communication content includes information transferred between a plurality of participants of the communication group prior to the one or more new participants being added to the communication group; receive a user input indicating a second selected portion of the communication content for providing to the one or more new participants; and send, via the at least one communication interface, an indication indicating the second selected portion of the communication content for providing to the one or more new participants.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
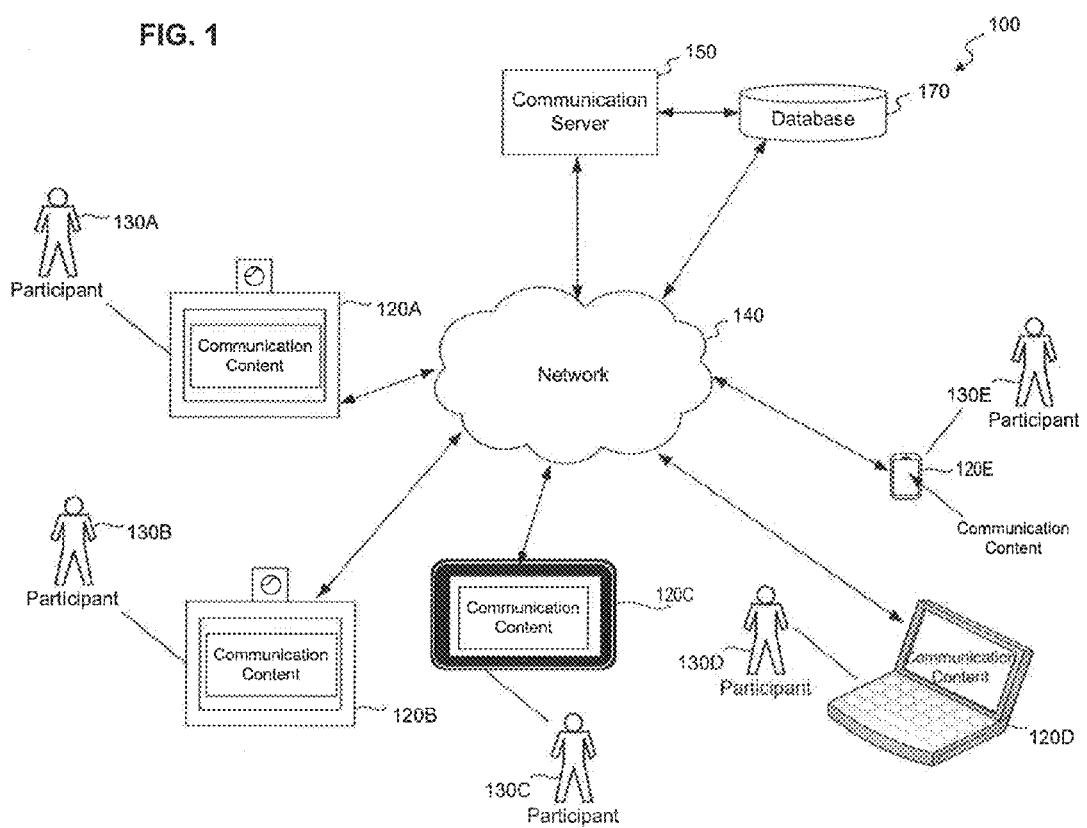
FIG. 1 is a diagram of an example of a communications system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

In a group communication environment, such as a collaboration platform, a chat application, a social network application, etc., a member of an existing communication group may initiate a process of adding new participants to an ongoing communication thread, when group communication has already been conducted among the existing participants. After the new participants join the communication group, it may be necessary to provide certain historical communication content to the new participants such that the new participants may understand the context of the communication and join the group communication in a meaningful way. Thus, it is desirable that a user interface is provided to the existing participants for selecting and/or editing historical communication content that is to be provided to the new participants of the existing communication group.

Example embodiments of the present disclosure provide methods, devices, and systems for providing historical communication content to new participants of a communication group. Consistent with disclosed embodiments, a communication server may receive a request to add one or more new participants to an existing communication group via a network interface. The communication server may also receive, from one or more members of the existing communication group, one or more selections indicating one or more selected portions of communication content for providing to the one or more new participants. Based on the received selections, the communication server may determine a portion of the historical communication content for providing to the one or more new participants and accordingly provide the determined portion of the historical communication content to one or more user devices associated with the new participants via the network interface.

The disclosed embodiments further include a user device for providing historical communication content to new participants of a communication group. Consistent with disclosed embodiments, a user device may receive a notification from a communication server that one or more new participants are added to an existing communication group via a communication interface. For example, the user device may be associated with an existing participant of the communication group. The user device may also receive an indication requesting approval or confirmation to provide a first selected portion of historical communication content to the new participants. For example, the first selected portion of historical communication content may be provided by another existing participant of the communication group. Subsequently, the user device may receive a user input indicating a second selected portion of the historical communication content for providing to the new participants and send an indication to the communication server indicating the second selected portion of the historical communication content via the communication interface. For example, the second selected portion of the historical communication content may include less amount of information than that of the first selected portion of the historical communication content.

The embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a communications system 100 in which various implementations as described herein may be practiced. As shown in FIG. 1, communications system 100 includes a plurality of user devices 120A-120E associated with a plurality of participants 130A-130E respectively. In some embodiments, communications system 100 is a collaborative environment that allows a group of participants (e.g., one or more participants 130A-130E) using associated user devices (e.g., one or more user devices 120A-120E) to engage in communications, such as instant messaging (IM), chat, email, voice over IP (VoIP) phone call, audio or video conferencing, etc., as well as sharing communication content associated with the collaboration such as data files, images, audio/video content, etc. In the present disclosure, communication, which is also referred to as communication content, includes any type of information exchange, such as messaging, chat, files shared, audio or video content, between a group of participants as well as entries made by any participant in a communication group. The terms communication, communications, and communication content are intended to be inter-exchangeable in this disclosure. In other embodiments, communications system 100 is, for example, a communication platform based on a chat application or a social network application that allows a group of participants (e.g., 130A-130E) to exchange messages, documents, audio or video content, gaming, and otherwise interact with one another in real-time using associated user devices (e.g., 120A-120E). For example, participants 130A-130E may belong to a same community or workspace, or share a common interest or goal, and a communication group may be set up to enhance the efficiency and productivity of information transfer among the participants. In the present disclosure, information exchanged among a group of participants including messages, emails, shared documents, audio/video recordings, links to Internet or web based content, or any other types of information exchanged between two or more individuals.

As shown in FIG. 1, communications system 100 includes one or more user devices 120A-120E (collectively as user devices 120), a network 140, a communication server 150, and a database 170. The components and arrangements shown in FIG. 1 are not intended to limit the disclosed embodiments, as the system components used to implement the disclosed processes and features can vary. For example, communications system 100 may include multiple communication servers 150, and each communication server 150 may host a certain type of communication service, e.g., IM, VoIP, video conferencing, such that various types of multimedia services may be provided to the user devices 120.

The network 140 facilitates communications and sharing of content between the user devices 120 and the communication server 150. The network 140 may be any type of networks that provides communications, exchanges information, and/or facilitates the exchange of information between the communication server 150 and user devices 120. For example, the network 140 may be the Internet, a Local Area Network, a cellular network, a public switched telephone network ("PSTN"), or other suitable connection(s) that enables communications system 100 to send and receive information between the components of communications system 100. A network may support a variety of messaging formats, and may further support a variety of services and applications for user devices 120.

The communication server 150 may be a system associated with a communication service provider which provides a variety of data or services, such as voice, messaging, real-time audio/video, to users, such as participants 130A-130E. The communication server 150 may be a computer-based system including computer system components, desktop computers, workstations, tablets, hand held computing devices, memory devices, and/or internal network(s) connecting the components. The communication server 150 may be configured to receive information from user devices 120 over the network 140, process the information, store the information, and/or transmit information to the user devices 120 over the network 140.

For example, the communication server 150 is configured to: establish a group communication session among a communication group selected from participants 130A-130E (collectively as participants 130) through user devices 120A-120E; manage the communication session for information exchange among the group; and control sharing of content among the group. In the present disclosure, a communication group includes a plurality of participants exchanging information with one another via associated user devices. Participants may be included (e.g. invited or added) or excluded (e.g. by leaving the communication group or being blocked) in a communication group. A plurality of group communication sessions may be maintained by the communication server 150 simultaneously. The communication server 150 may also be configured to maintain a list of participants 130A-130E for each group communication session, along with the role of each participants 130A-130E and their access control settings, such as a moderator who is the host of the communication session, a creator who initiated the communication session, one or more users that post messages and participate in audio/video conferences among the group, and so on. In some implementations, the functionality of the communication server 150 described in the present disclosure is distributed among one or more of the user devices 120A-120E. For example, a part or all of the communication content may be stored in one or more of the user devices 120, and one or more of the user devices 120A-120E performs functions such as starting, maintaining, and/or closing (terminating) the communication session among the group.

The database 170 includes one or more physical or virtual storages coupled with the communication server 150. The database 170 is configured to store current and/or historical communications of an ongoing communication session and/or any previously completed communication sessions. The database 170 may also be adapted to store historical communications such as video/audio messages, documents, or shared content among the communication participants 130. The data stored in the database 170 may be transmitted to the communication server 150 before or during an ongoing communication session. In some embodiments, the database 170 is stored in a cloud-based server (not shown) that is accessible by the communication server 150 and/or the user devices 120 through the network 140. While the database 170 is illustrated as an external device connected to the communication server 150, the database 170 may also reside within the communication server 150 as an internal component of the communication server 150.

As shown in FIG. 1, participants 130A-130E of a communication group communicate with one another using various types of user devices 120A-120E in a group communication session. As an example, user devices 120A, 120B, and 120D include a display such as a television, tablet, computer monitor, video conferencing console, or laptop computer screen. User devices 120A, 120B, and 120D may also include video/audio input devices such as a video camera, web camera, or the like. As another example, user devices 120C and 120E include mobile devices such as a tablet or a smartphone having display and video/audio capture capabilities. In some embodiments, the communications system 100 may also include devices without display or video capture capabilities, such as a cellular phone or a telephone (not shown). User devices 120A-120E may also include one or more software applications that facilitate the user devices to engage in communications, such as IM, VoIP, video conferences, with one another in a group communication environment where each participant may view content posted by other participants and may post content that can be accessed by other participants in the communication group.

Figure 2:
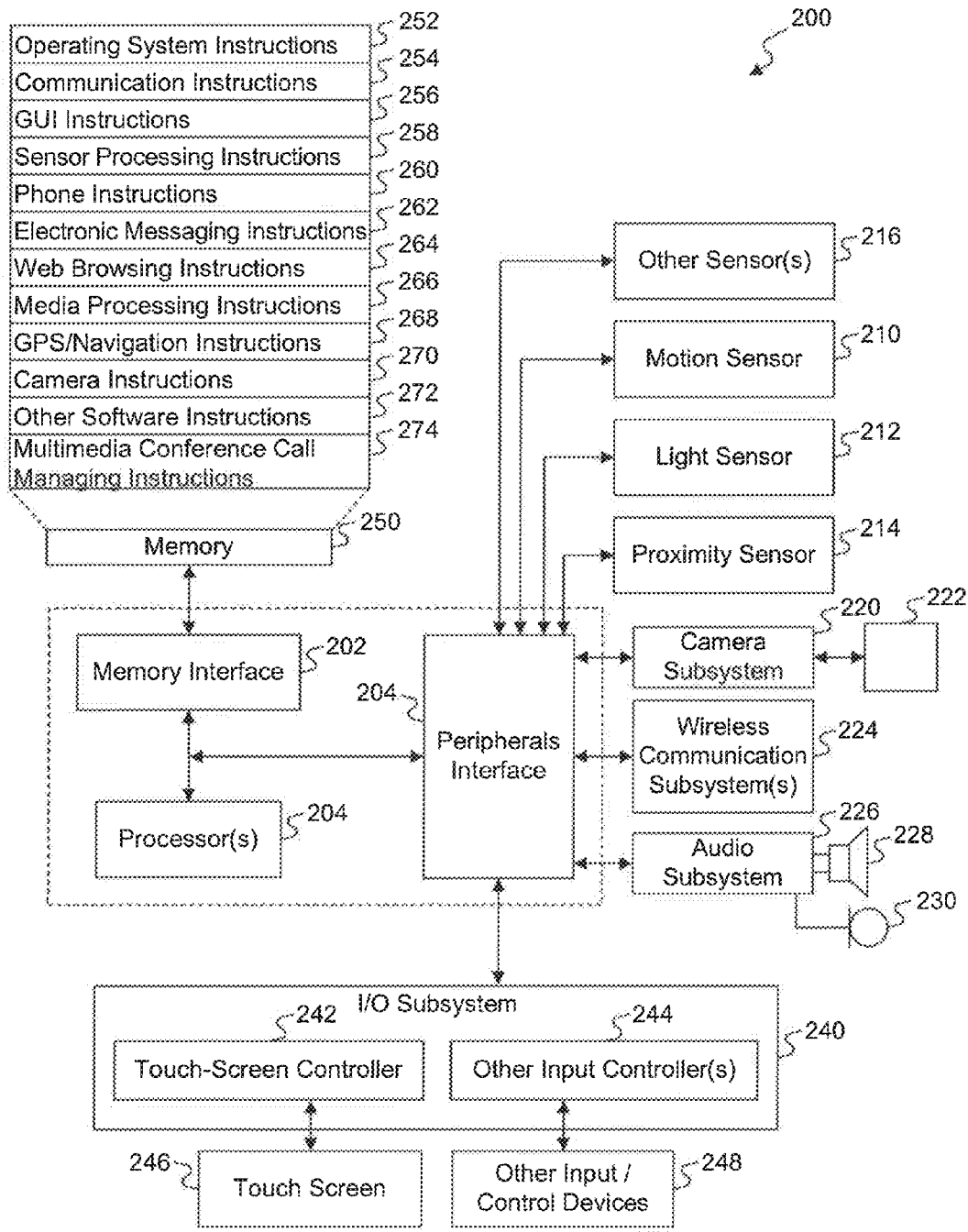
FIG. 2 is a diagram of an example user device for implementing embodiments consistent with the present disclosure.

FIG. 2 is a diagram of an example of a user device 200 for use in a communications system, such as communications system 100. The user device 200 can be used to implement computer programs, applications, methods, processes, or other software to perform embodiments described in the present disclosure, such as the user devices 120A-120E. The user device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities. A GPS receiver can be integrated with, or connected to, the user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes a Ethernet port, radio frequency receivers and transmitters and/or optical (e.g., infrared) receivers and transmitters. The specific design and implementation of the wireless/wired communication subsystem 224 depends on the communication network(s) over which the user device 200 is intended to operate. For example, in some embodiments, the user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. While a touch screen 246 is shown in FIG. 2, the I/O subsystem 240 may include a display screen (e.g., CRT or LCD) in place of the touch screen 246.

The other input controller(s) 244 is coupled to other input/control devices 248, such as one or more buttons, rocker switches, thumb-wheel, infrared port, USB port, and/or a pointer device such as a stylus. The touch screen 246 can, for example, also be used to implement virtual or soft buttons and/or a keyboard.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. The memory 250 may also include multimedia conference call managing instructions 274 to facilitate conference call related processes and instructions.

In some embodiments, the communication instructions 254 may include software applications to facilitate connection with the communication server 150 that hosts group communication between a group of participants, and the graphical user interface instructions 256 may include a software program that facilitates a participant associated with the user device to receive messages from the communication server 150, provide user input, and so on. Further, the communication instructions 254 may include software applications for a participant associated with the user device to select a portion of historical communication content for providing to new participants of an existing communication group and send the selection to the communication server 150. The graphical user interface instructions 256 may include software program that facilitates a participant associated with the user device to select a portion of historical communication content for providing to the new participants, receive messages from the communication server 150 relating to another participant's selection of historical communication content for providing to the new participants, provide user input as to whether a selection of the historical communication content is acceptable, and so on.

Each of the above identified instructions and applications may correspond to a set of instructions for performing one or more functions described above. These instructions need not be implemented as separate software programs, procedures, or modules. The memory 250 may include additional instructions or fewer instructions. Furthermore, various functions of the user device 200 may be implemented in hardware and/or in software, including in one or more signal processing and/or application specific integrated circuits.

Figure 3:
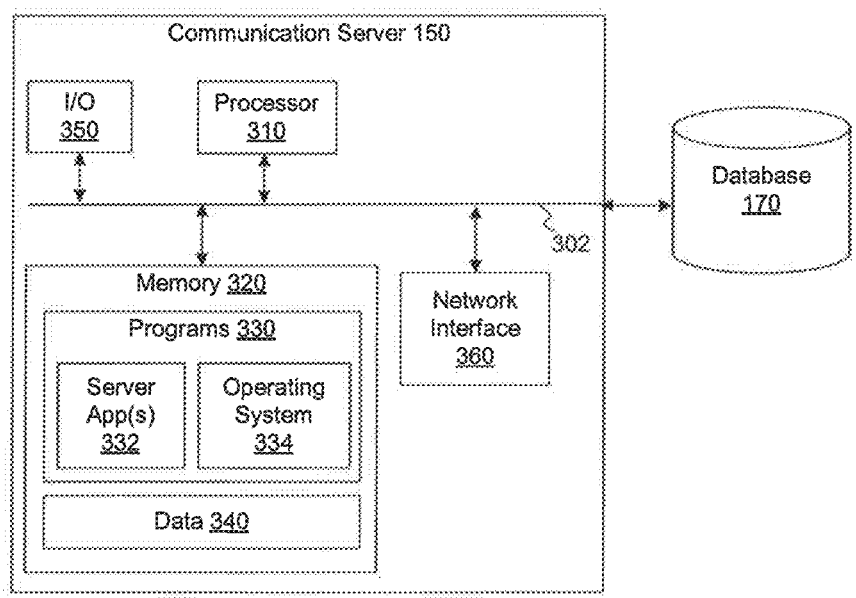
FIG. 3 is a diagram of an example communication server, consistent with the disclosed embodiments.

FIG. 3 shows a diagram of an example communication server 150, consistent with the disclosed embodiments. The communication server 150 includes a bus 302 (or other communication mechanism) which interconnects subsystems and components for transferring information within the communication server 150. As shown, the communication server 150 may include one or more processors 310, input/output ("I/O") devices 350, network interface 360 (e.g., a modem, Ethernet card, or any other interface configured to exchange data with a network), and one or more memories 320 storing programs 330 including, for example, server app(s) 332, operating system 334, and data 340, and can communicate with an external database 170 (which, for some embodiments, may be included within the communication server 150). The communication server 150 may be a single server or may be configured as a distributed computer system including multiple servers, server farms, clouds, or computers that interoperate to perform one or more of the processes and functionalities associated with the disclosed embodiments.

The processor 310 may be one or more processing devices configured to perform functions of the disclosed methods, such as a microprocessor manufactured by Intel™ or manufactured by AMD™. The processor 310 may comprise a single core or multiple core processors executing parallel processes simultaneously. For example, the processor 310 may be a single core processor configured with virtual processing technologies. In certain embodiments, the processor 310 may use logical processors to simultaneously execute and control multiple processes. The processor 310 may implement virtual machine technologies, or other technologies to provide the ability to execute, control, run, manipulate, store, etc. multiple software processes, applications, programs, etc. In some embodiments, the processor 310 may include a multiple-core processor arrangement (e.g., dual, quad core, etc.) configured to provide parallel processing functionalities to allow the communication server 150 to execute multiple processes simultaneously. It is appreciated that other types of processor arrangements could be implemented that provide for the capabilities disclosed herein.

The memory 320 may be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The communication server 150 may include one or more storage devices configured to store information used by processor 310 (or other components) to perform certain functions related to the disclosed embodiments. For example, the communication server 150 may include memory 320 that includes instructions to enable the processor 310 to execute one or more applications, such as server apps 332, operating system 334, and any other type of application or software known to be available on computer systems. Alternatively or additionally, the instructions, application programs, etc. may be stored in an external database 170 (which can also be internal to the communication server 150) or external storage communicatively coupled with the communication server 150 (not shown), such as one or more database or memory accessible over the network 140.

The database 170 or other external storage may be a volatile or non-volatile, magnetic, semiconductor, tape, optical, removable, non-removable, or other type of storage device or tangible or non-transitory computer-readable medium. The memory 320 and database 170 may include one or more memory devices that store data and instructions used to perform one or more features of the disclosed embodiments. The memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the communication server 150 may be communicatively connected to one or more remote memory devices (e.g., remote databases (not shown)) through network 140 or a different network. The remote memory devices can be configured to store information that the communication server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 330 includes one or more software modules causing processor 310 to perform one or more functions of the disclosed embodiments. Moreover, the processor 310 may execute one or more programs located remotely from one or more components of the communications system 100. For example, the communication server 150 may access one or more remote programs that, when executed, perform functions related to disclosed embodiments.

In the presently described embodiment, server app(s) 332 causes the processor 310 to perform one or more functions of the disclosed methods. For example, the server app(s) 332 may cause the processor 310 to establish a communication group among a plurality of participants and to provide historical communication content among the group to user devices associated with newly added participants. In some embodiments, other components of the communications system 100 may be configured to perform one or more functions of the disclosed methods. For example, user devices 120A-120E may be configured to initiate a request to add new participants to an existing communication group and select a portion of historical communication content to provide to the new participants. As another example, user devices 120A-120E may be configured to provide a user interface for a participant to review and modify a portion of historical communication content selected by another participant for providing to the new participants.

In some embodiments, the program(s) 330 may include the operating system 334 performing operating system functions when executed by one or more processors such as the processor 310. By way of example, the operating system 334 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 334. The communication server 150 may also include software that, when executed by a processor, provides communications with network 140 through the network interface 360 and/or a direct connection to one or more user devices 120A-120E.

In some embodiments, the data 340 may include, for example, profiles of participants of a communication group and historical communications optionally coupled with any communication content between the participants. For example, the data 340 may include instant messages sent by the participants, documents and audio/video files shared by the participants, and access control settings associated with the shared files.

The communication server 150 may also include one or more I/O devices 350 having one or more interfaces for receiving signals or input from devices and providing signals or output to one or more devices that allow data to be received and/or transmitted by the communication server 150. For example, the communication server 150 may include interface components for interfacing with one or more input devices, such as one or more keyboards, mouse devices, and the like, that enable the communication server 150 to receive input from an operator or administrator (not shown).

Figure 4:
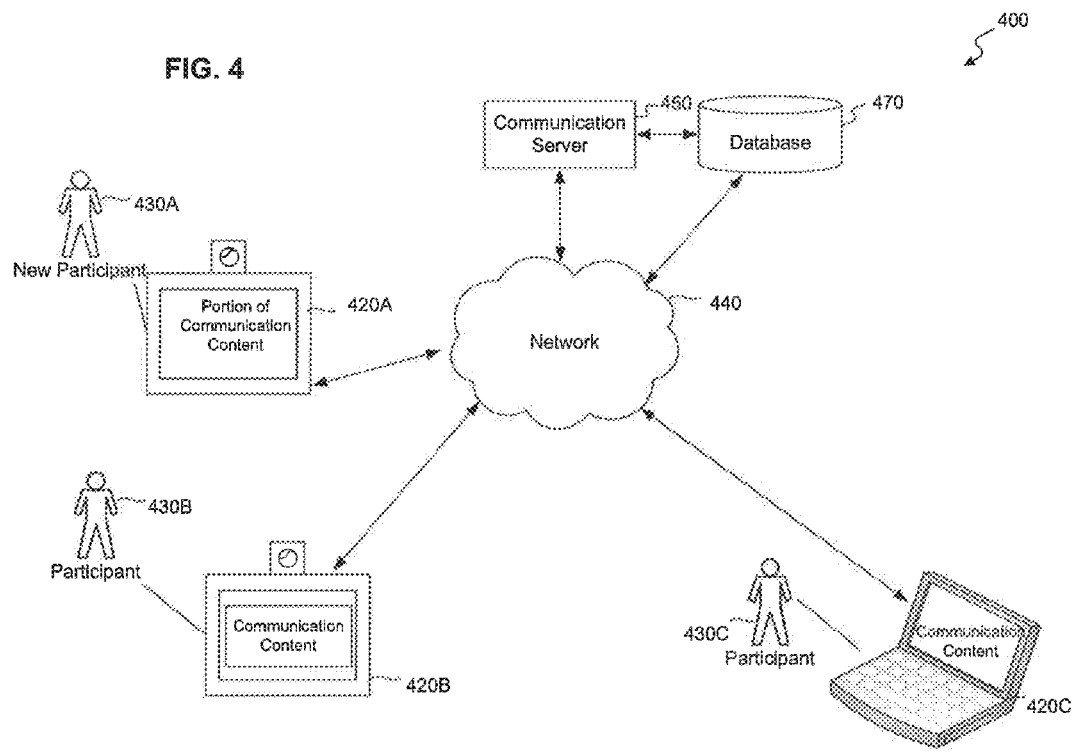
FIG. 4 is a diagram of an example communications system in which various implementations described herein may be practiced.

FIG. 4 is a diagram of another example communications system 400 in which various implementations of providing historical communication content to new participants of an existing communication group may be practiced. As shown in FIG. 4, similar to the communications system 100, the communications system 400 includes one or more user devices 420A-420C (collectively as user devices 420), a network 440, a communication server 450, and a database 470. The components and arrangements shown in FIG. 4 are not intended to limit the disclosed embodiments, as the system components used to implement the disclosed processes and features can vary.

In this example, an existing communication group is established among participants 430B and 430C, in which communication has been in progress between participants 430B and 430C for a certain period of time. At a certain point, participant 430B initiates a process to add new participant 430A into the existing communication group. For example, participant 430B may send a request to the communication server 450 using the user device 420B to add participant 430A to the existing communication group. In response to the request, the communication server 450 may send an invitation to the user device 420A (for example by way of a notification presented to participant 430A that can be accepted or rejected) that is associated with participant 430A for joining the existing communication group, and after participant 430A accepts the invitation, the existing communication group is expanded to include original participants 430B and 430C and new participant 430A. In some embodiments, the invitation is presented to participant 430A in more user devices (not shown) associated with participant 430A. Accordingly, participant 430A can accept the invitation to be added to the communication group from any associated user devices. Likewise, participant 430A can join in or participate in communication group from any associated devices in communications system 100.

As communication has been conducted between original participants 430B and 430C before new participant 430A joins the communication group, one of the original participants, such as participant 430B, may desire to provide certain historical communication or communication content to the new participant 430A to facilitate participation of new participant 430A in the communication group. The historical communication may include, for example, messages exchanged, and the historical communication content may include files shared between participants 430B and 430C, prior to the joining of new participant 430A. The historical communication or communication content may be displayed on the screen of user devices 420B and 420C, and if any files are shared between participants 430B and 430C, the shared files may be stored in the user devices 420B and 420C, the communication server 450, the database 470, and/or any cloud-based server accessible by the user devices 420B and 420C.

To provide certain historical communication to new participant 430A, original participant 430B may select a portion of the historical communication content using the user device 420B and send the selection to the communication server 450. For example, a user interface may be provided on the user device 420B that allows the participant 430B to select an insert point in the past communication history which indicates the earliest time entry in the past communication history to be provided to the new participant 430A. The selected insert point indicates that communication content occurring after the insert point may be provided to the new participant 430A, but not the communication content occurring before the insert point. As another example, a user interface may be provided on the user device 420B that allows the participant 430B to select multiple segments of the past communication history which may be contiguous or non-contiguous content of the communication. As another example, a user interface may be provided on the user device 420B that allows the participant 430B to include or exclude content posted by certain participant, such as the participant 430C, in the historical communication content for providing to the new participant 430A. As another example, a user interface may be provided on the user device 420B that allows the participant 430B to enter keywords for selecting historical communication content for providing to the new participant 430A.

After receiving the selection of the historical communication content from the participant 430B, the communication server 450 may send an indication to the user device 420C associated with participant 430C inquiring whether the selection provided by the participant 430B is acceptable. For example, the communication server 450 may send an indication to the user device 420C indicating the selection provided by the participant 430B and requesting participant 430C to approve or deny the selection. A user interface may be provided on the user device 420C that allows the participant 430C to review the selection made by the participant 430B. In some embodiments, a user interface may be provided on the user device 420C that allows the participant 430C to select the portion of historical communication content that participant 430C would prefer to provide to the new participant 430A. The user interface may also allow the participant 430C to approve, deny (or reject), or modify the selection made by the participant 430B. In some embodiments, portions of the communication content may be explicitly marked as "private" or may be temporarily or permanently expurgated, and if a new participant is added at an insert point including these portions, the new participant may not be able to see these portions. For example, if the participant 430C considers the selection made by the participant 430B to be acceptable, the participant 430C may enter a user input on the user device 420C indicating acceptance of the selection. If the participant 430C considers the selection made by the participant 430B to be unacceptable, the participant 430C may enter a user input on the user device 420C indicating denial of the selection. Alternatively, the participant 430C may enter a user input on the user device 420C indicating another selection of the historical communication content different from the selection made by the participant 430B. For example, the participant 430C may exclude certain content in the selection made by the participant 430B. The participant 430C may also include additional content to the selection made by the participant 430B. The user device 420C may send an indication to the communication server 450 indicating the selection made by the participant 430C.

While in FIG. 4 the communication group includes two original participants 430B and 430C, the communication group may include more than two participants before the joining of new participant 430A. In the scenario where more than two existing participants are present in the communication group, after receiving a selection of historical communication content from one of the existing participants, the communication server 450 may send an indication to each of the remaining existing participants inquiring whether the selection is acceptable. Similar to the user input described above in connection with participant 420C, each of the remaining existing participants may enter a user input on the associated user device indicating whether to accept, deny (or reject), or modify the selection made by the other participant, and the associated user device may send an indication to the communication server 450 accordingly.

After receiving the indication from the user device 420C, the communication server 450 may determine a portion of the historical communication content for providing to the new participant 430A. For example, if the indication indicates a denial of the selection made by the participant 430B, the communication server 450 may determine that no historical communication content is to be provided to the new participant 430A. If the indication indicates an acceptance of the selection made by the participant 430B, the communication server 450 may determine to provide the selection of the historical communication content made by the participant 430B to the new participant 430A. If the indication indicates a selection of the historical communication content made by the participant 430C different from the selection made by the participant 430B, the communication server 450 may determine an overlapping portion of content between the two selections for providing to the new participant 430A.

In some embodiments, the communication server 450 may implement a system rule for providing historical communication content to the new participants, in addition to the selections provided by the existing participants. For example, the communication server 450 may implement a system rule that messages containing certain sensitive words are not provided to the new participants. As another example, all messages containing names of select individuals, such as the new participant 430A, may be excluded from the content released to those individuals. Thus, the communication server 450 may remove certain messages containing the sensitive words for providing to the new participant 430A even though those messages may be selected by both participants 430B and 430C for providing to the new participant 430A. As another example, the communication server 450 may implement a system rule that documents exceeding a certain size are not provided to the new participants. Thus, the communication server 450 may remove certain documents in the historical communication content that exceeds the permitted size for providing to the new participant 430A, even though those documents may be selected by both participants 430B and 430C for providing to the new participant 430A.

In some embodiments, the communication server 450 may set access permission for certain items in the historical communication content to be provided to the new participant 430A. For example, when a weblink to a document stored on the Internet is to be provided to the new participant 430A as part of the historical communication content, existing participant 430B may restrict the document to be readable but not writable by the new participant 430A in selecting to provide the document to the new participant, and may send the access permission setting for the document to the communication server 450. Correspondingly, the communication server 450 may set the access permission for the document to be readable but not writable by the new participant 430A when providing the document to the new participant 430A. As another example, the communication server 450 may implement one or more rules to exclude confidential information to provide to the new participant 430A unless the new participant 430A satisfies a certain condition. For instance, the rules may include security policies such as only providing the confidential information to the new participant 430A if the new participant 430A is an employee at a minimum security level inside an organization.

In the scenario where more than two existing participants are present in the communication group, the communication server 450 receives multiple indications from the existing participants and may determine a portion of the historical communication content for providing to the new participant based on the multiple indications. For example, the communication server 450 may determine an overlapping portion of content between the each of the selections for providing to the new participant. In other words, the communication server 450 may determine to provide only the portion of content that is agreed by each of the existing participants to the new participant. Alternatively, the communication server 450 may determine that if a selected portion of content is approved by a majority of the existing participants, the selected portion of content may be provided to the new participant. Or the communication server 450 may determine that if a selected portion of content is approved by any of the existing participants, the selected portion of content may be provided to the new participant.

In some embodiments, one or more existing participants in the communication group may be assigned a role of moderator and may be given an authority of selecting the content to provide to the new participant. In this scenario, the moderator may determine the portion of historical communication contents to provide to the new participant based on selections provided by the existing participants. In some implementations, the moderator (or a creator of the communication group) may provide more historical communication contents to the new participant than those selected by other existing participants. The moderator may send the contents to the new participant directly using an associated user device, e.g., by emailing the contents directly to the new participant, or may send a request indicating the selected contents to the communication server using an associated user device. Alternatively, the moderator may determine the portion of historical communication contents to provide to the new participant without providing other existing participants an opportunity to provide a feedback or make a proposed selection. In other embodiments, the moderator may not be given special authority in selecting the content to provide to the new participant and may operate similarly in the process as other participants of the communication group. Various implementations or combinations may be performed without departing from the scope of the present disclosure when the selections provided by the existing participants are not unanimous.

After determining the portion of historical communication content to be provided to the new participant 430A, the communication server 450 retrieves the communication content from a local memory, namely the database 470, the user devices 420B and 420C, and/or a cloud-based remote server, and sends the communication content to the user device 430A associated with the new participant 430A for display. The user device 420A then provides a user interface that allows the new participant 430A to view and/or access the received historical communication content.

FIGS. 5A-5M illustrate an example method of providing historical communication content, in accordance with embodiments of the present disclosure. The example diagrams depicted in FIGS. 5A-5M illustrate embodiments in which historical communication content is provided to new participants of an existing communication group. The diagrams depicted in FIGS. 5A-5M are examples only and are not intended to be limiting.

Figure 5A:
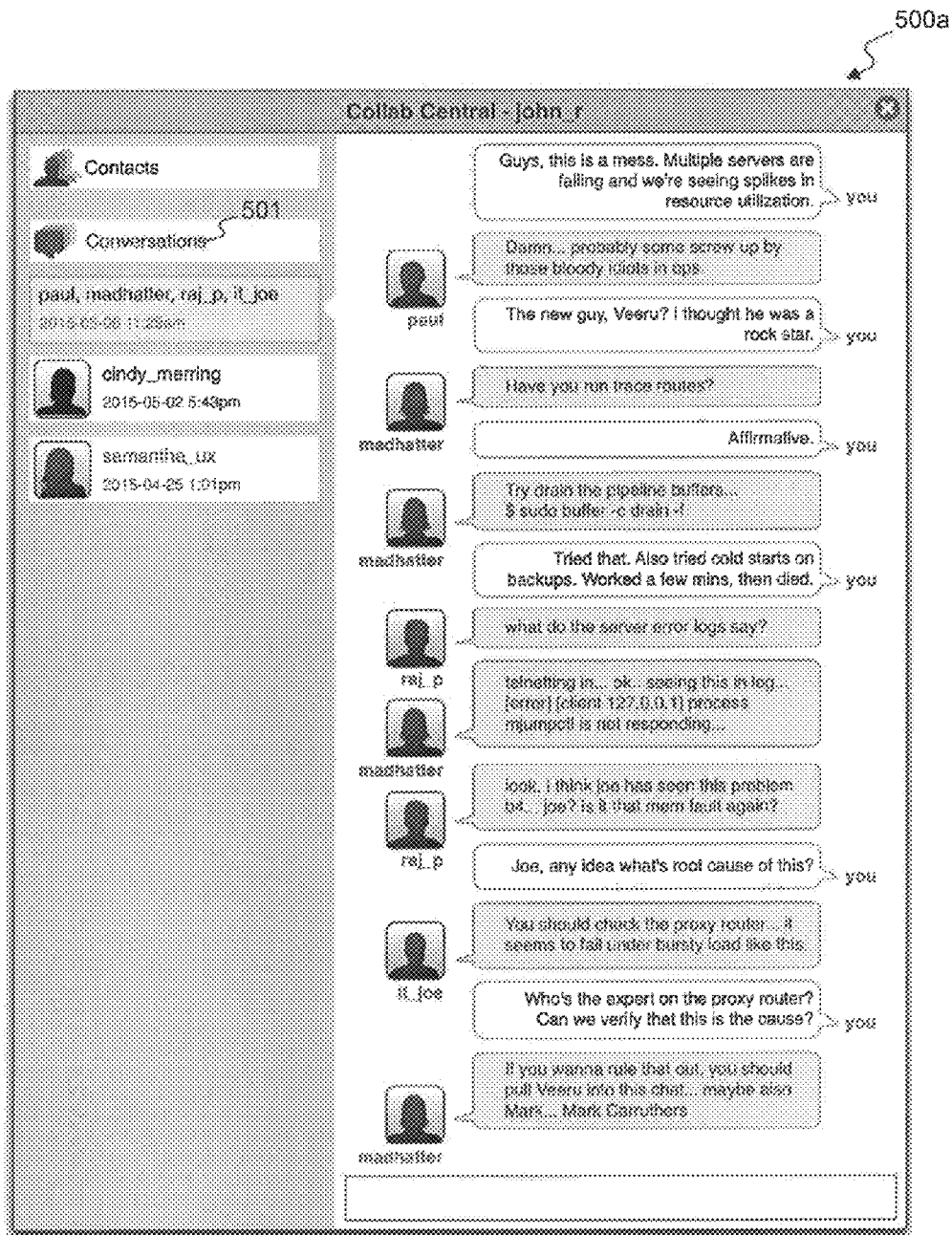
FIGS. 5A-5M illustrate an example user interface for describing a method of providing historical communication content, in accordance with embodiments of the present disclosure.

FIG. 5A shows a display 500a on a user device (such as user device 420B of FIG. 4) associated with a user named "john_r" (such as participant 430B of FIG. 4) who is a participant of an ongoing collaboration thread. It can be seen that the collaboration thread 501 includes five participants, i.e., "john_r", "paul", "madhatter", "raj_p", and "it_joe", and communication has been conducted among the five participants.

Figure 5B:
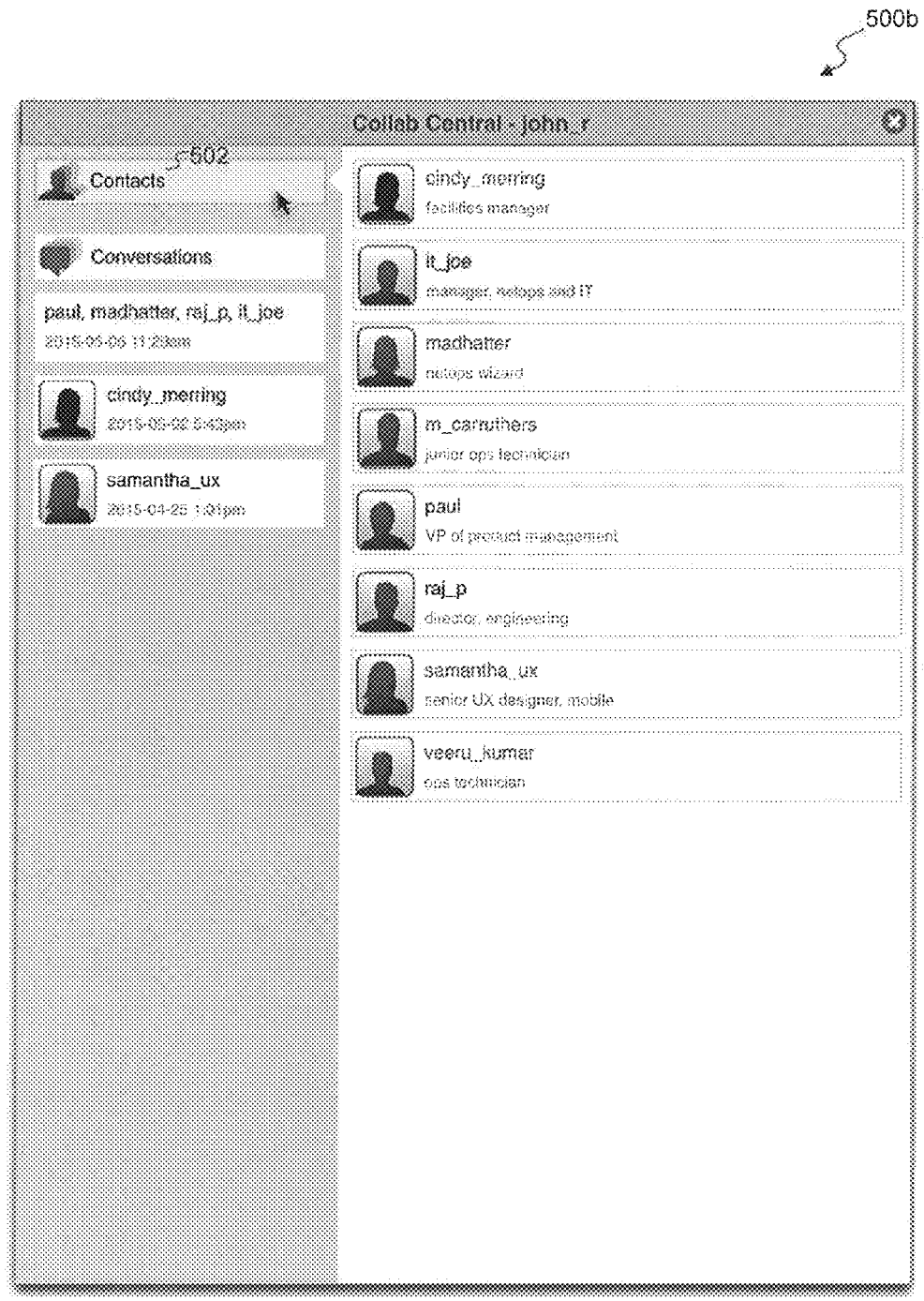

FIG. 5B shows another display 500b on the user device associated with "john_r". At this point, participant "john_r" opens his contacts list such that he can add new participants to the ongoing collaboration thread from his contacts. Visual representations of individuals in the list of contacts may be displayed once "john_r" selects the "Contacts" icon 502 on the display. This diagram illustrates an example of adding new participants to an existing group communication, and other methods known by persons skilled in the art may also be used for adding certain new participants to an existing group communication, such as by entering the emails, user names of the new participants, by searching the names of the new participants in a directory, or the like. The participant "john_r" who initiates adding new participants to the ongoing collaboration thread may be a moderator of the collaboration thread or a member of the collaboration thread with authorization to invite new participants to the collaboration thread.

Figure 5C:
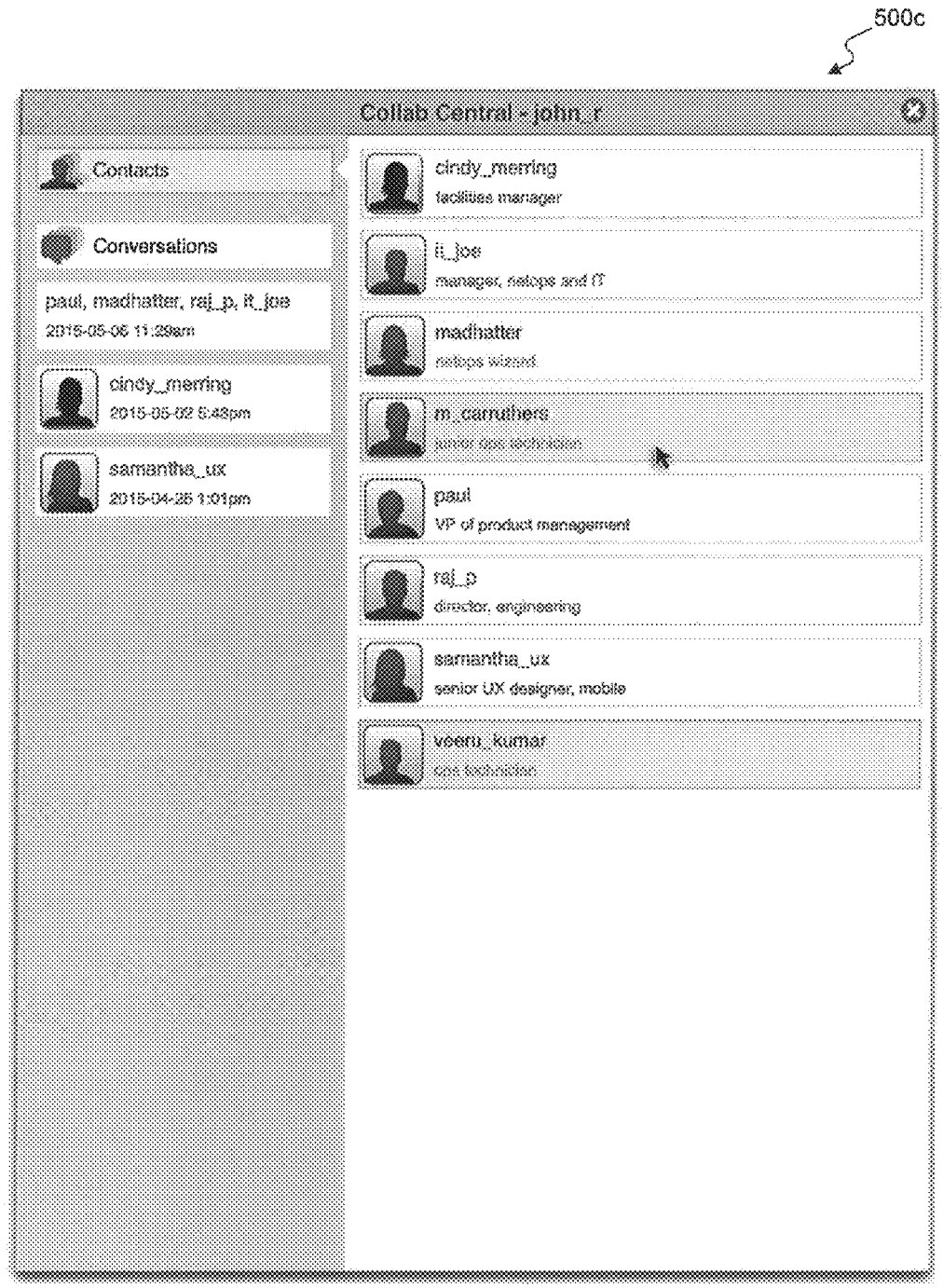

FIG. 5C shows another display 500c on the user device associated with "john_r". It can be seen that visual representations of "m_carruthers" and "veeru_kumar" are highlighted in the list of contacts, indicating a selection of "m_carruthers" and "veeru_kumar" for further actions to be performed.

Figure 5D:
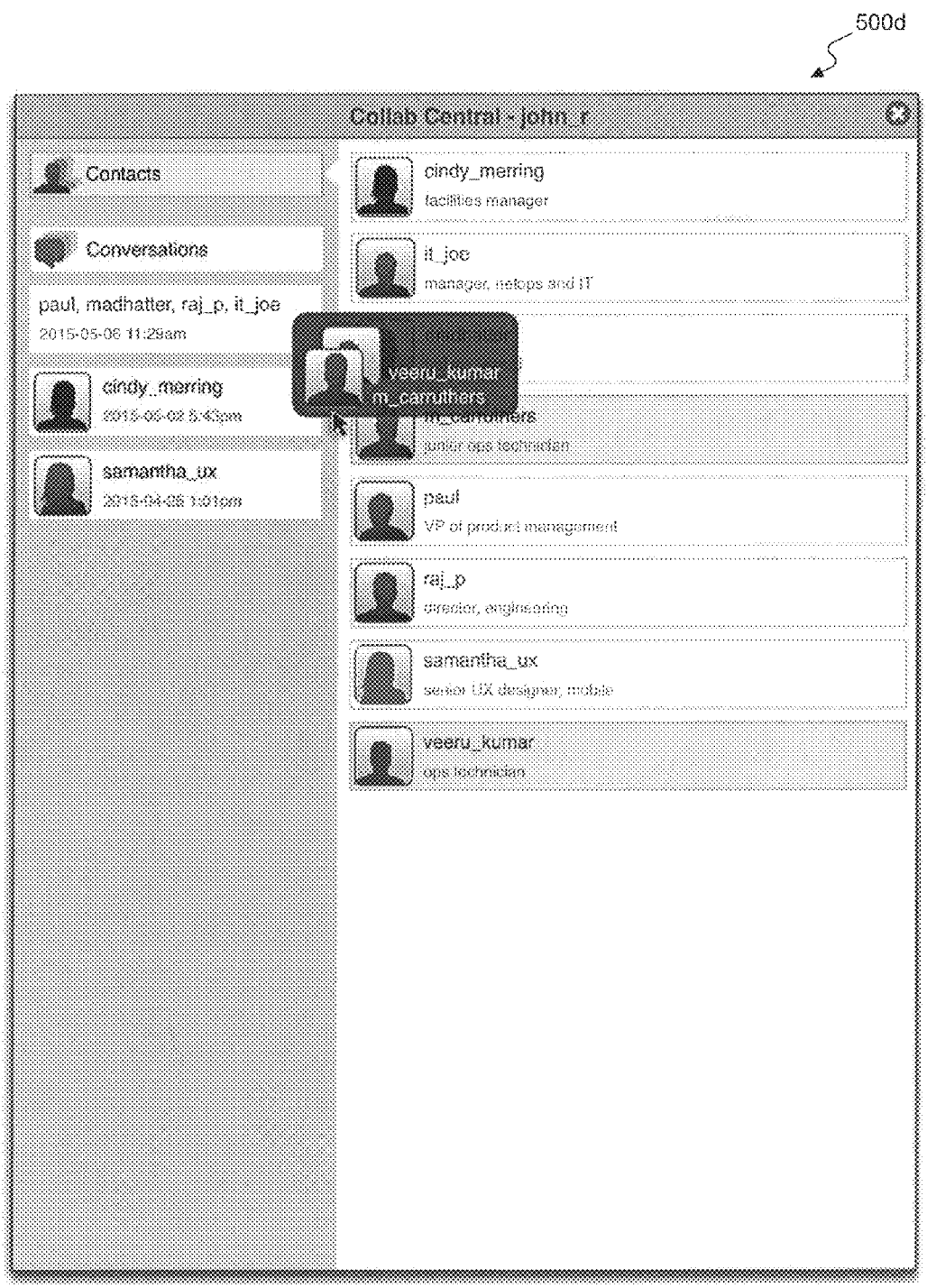

FIG. 5D shows another display 500d on the user device associated with "john_r". In this embodiment, user "john_r"

initiates a dragging action to the graphical icons representing "m_carruthers" and "veeru_kumar". The icons of "m_carruthers" and "veeru_kumar" are being dragged to a position of the "Conversations" icon on the display, indicating a request to add both "m_carruthers" and "veeru_kumar" to the ongoing collaboration thread as new participants. For example, a click-and-drag action or a touch-and-drag action may be performed on the icons of selected participants for adding them to the ongoing collaboration thread. Other types of user interactions known by persons skilled in the art may also be used for adding new participants to an existing group communication without departing the scope of the present disclosure.

Figure 5E:
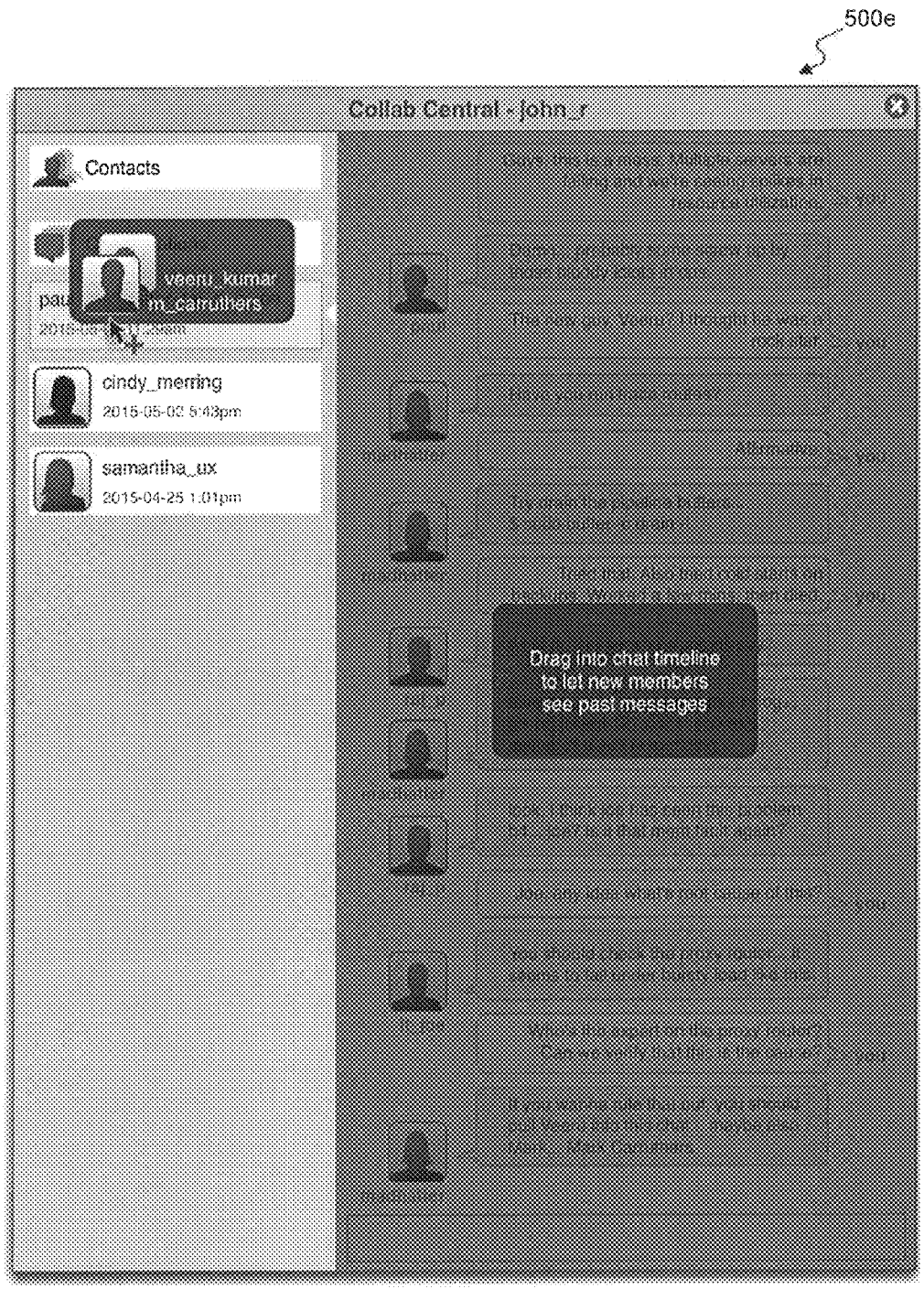

FIG. 5E shows another display 500e on the user device associated with "john_r". As shown in FIG. 5E, after adding "m_carruthers" and "veeru_kumar" to the ongoing collaboration thread as new participants, a prompt message may be displayed on the user device associated with "john_r", indicating that by dragging the graphical icon of "m_carruthers" and "veeru_kumar" into a position of the displayed communication history, historical communication content may be provided to the new participants "m_carruthers" and "veeru_kumar".

Figure 5F:
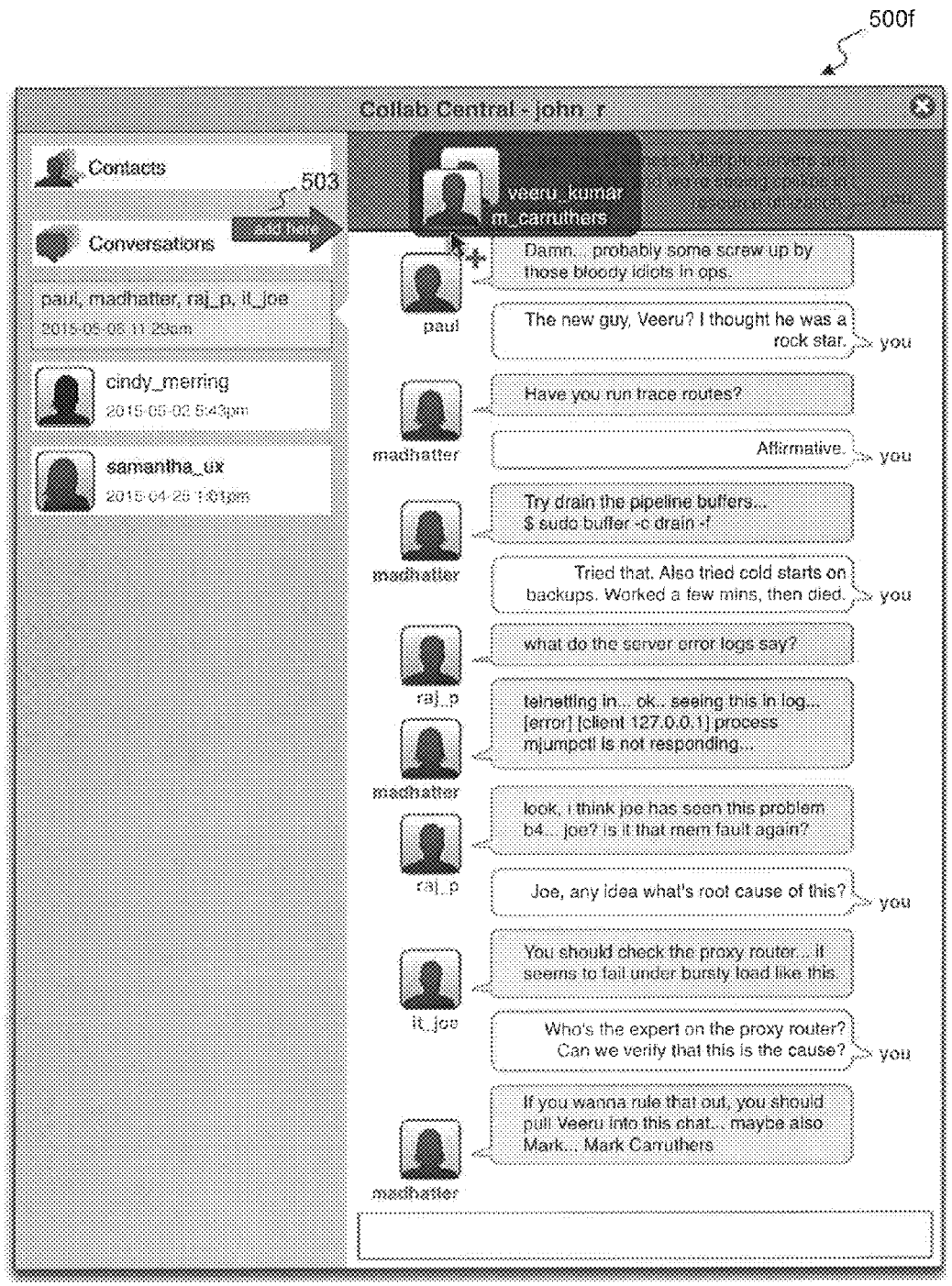

FIG. 5F shows another display 500f on the user device associated with "john_r". It can be seen that the graphical icon representing "m_carruthers" and "veeru_kumar" may be placed in a certain point of the displayed communication history, representing an insert point in the historical communication content, such that communication content occurring after the insert point 503 may be provided to the new participants "m_carruthers" and "veeru_kumar". In this example, existing participant "john_r" places the graphical icon representing "m_carruthers" and "veeru_kumar" at a point succeeding the comment he made about the messy situation on the top of the displayed communication history. For example, to place the graphical icon at a desired position on the display, "john_r" may end a drag-and-drop interaction by releasing a button of a pointer device, lifting the fingers from a touch interface, or otherwise indicating completion of the interaction in a manner consistent with the physical input device of the user device. By placing the graphical icon at the particular position on the display, "john_r" intends that the comment he made on the top of the displayed communication history not to be provided to the new participants "m_carruthers" and "veeru_kumar," and messages posted afterwards would be provided to the new participants.

Figure 5G:
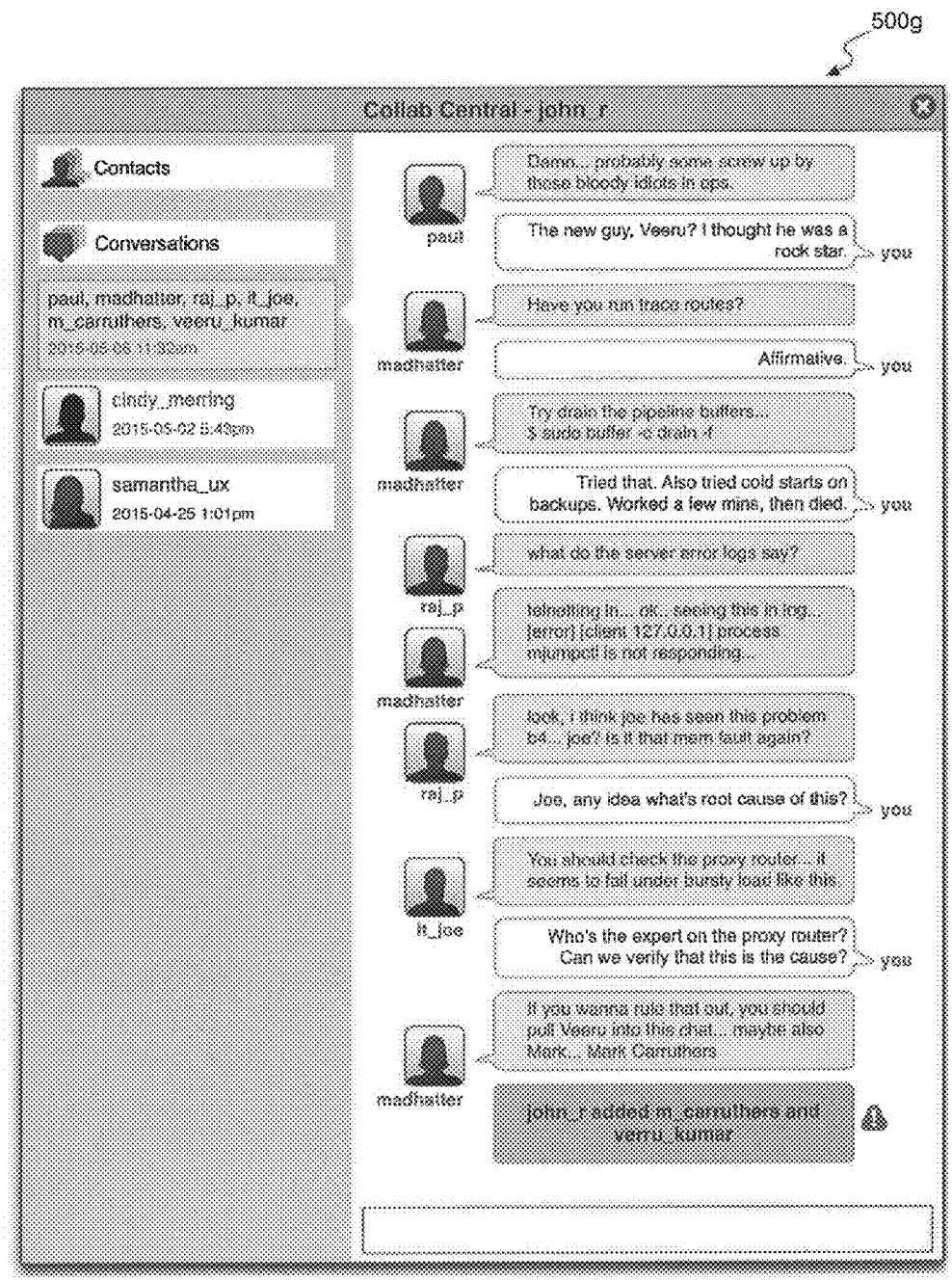

FIG. 5G shows another display 500g on the user device associated with "john_r". In this diagram, a notification is displayed on the user device associated with "john_r" that "m_carruthers" and "veeru_kumar" have been added to the collaboration thread as new participants.

Figure 5H:
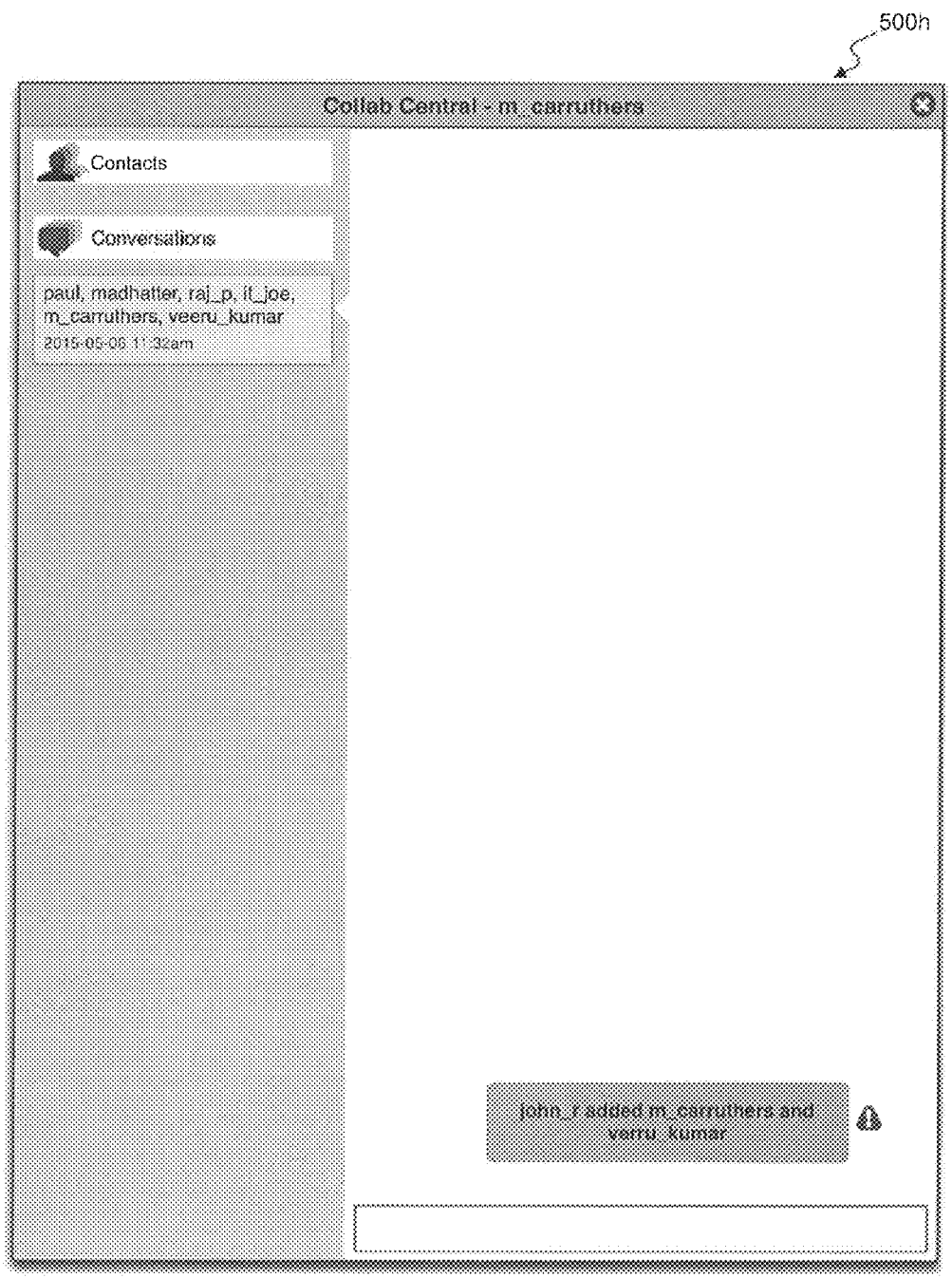

FIG. 5H shows a display 500h on a user device associated with new participant "m_carruthers". As shown in FIG. 5H, a notification is displayed on the user device associated with "m_carruthers" that "m_carruthers" and "veeru_kumar" have been added to the collaboration thread. At this point, no historical communication content is provided to the user device associated with "m_carruthers" yet, and although "m_carruthers" may freely participate in the collaboration thread, he has no access to the past communication history among the collaborative group.

Figure 5I:
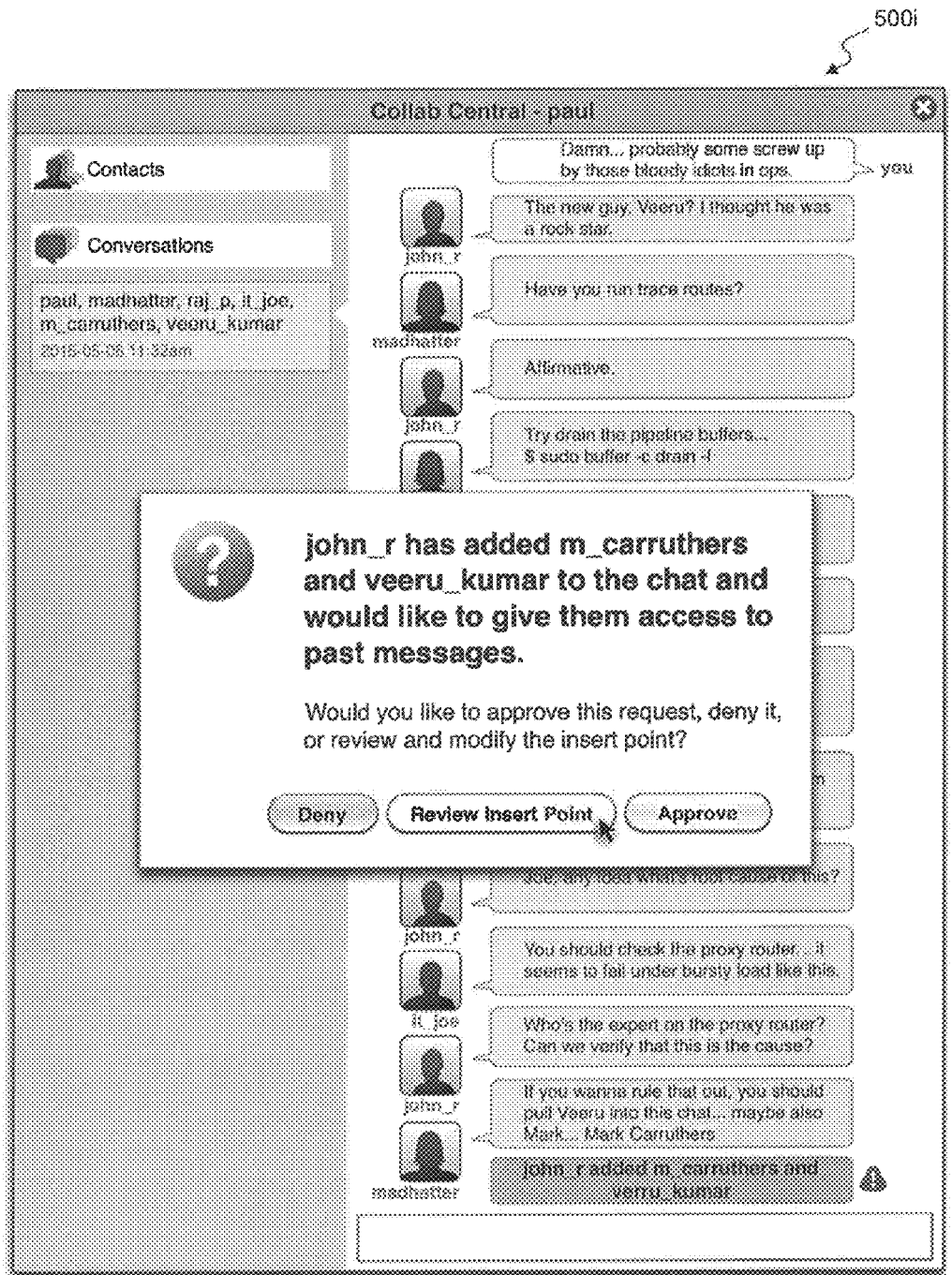

FIG. 5I shows a display 500i on a user device associated with "paul," who is another existing participant of the collaboration thread. As shown in FIG. 5I, a prompt message is displayed on the user device associated with "paul," indicating that: (i) new participants "m_carruthers" and "veeru_kumar" have been added to the collaboration thread; and (ii) that "john_r" would like to give them access to the historical communication content. The prompt message requests "paul" to take an action on whether to accept "john_r"'s request to give the new participants access to the historical communication content. For example, the prompt message provides "paul" an option to approve, deny, or review and modify the insert point, where the insert point represents an earliest time entry in the past communication history that is to be provided to the new participants. In this example, "paul" proceeds with selecting the option to review and modify the insert point.

Figure 5J:
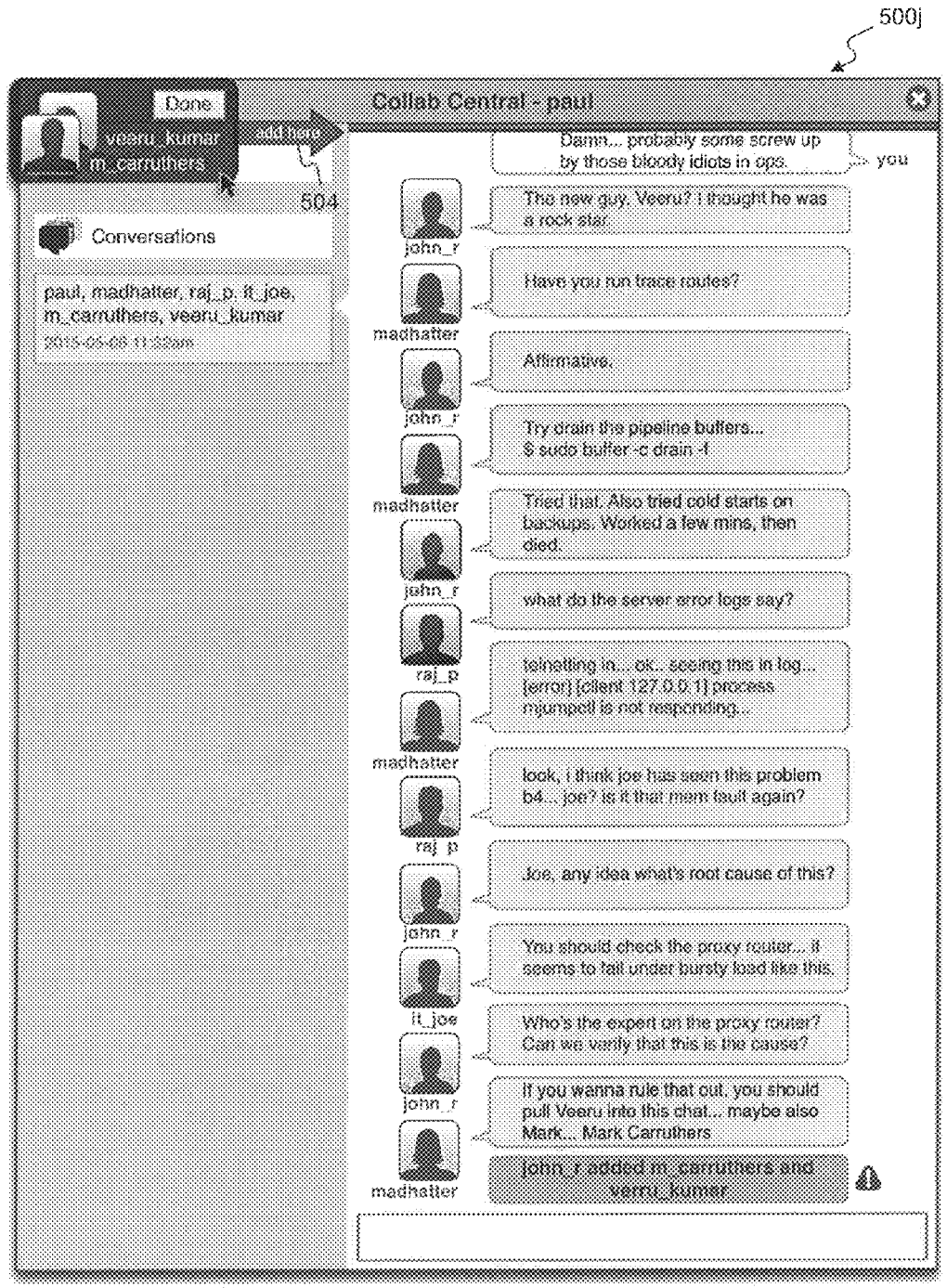

FIG. 5J shows another display 500j on the user device associated with "paul," after "paul" selects to review and modify the insert point. As shown in FIG. 5J, the insert point previously selected by "john_r" is displayed on the user device associated with "paul" as the insert point 504, and "paul" is allowed to move the insert point 504 forward in the communication history to further limit the historical communication content provided to the new participants. It can be seen that, in this example, "paul" is only given the option to move the insert point 504 forward to further limit the selection of communication content made by "john_r," and "paul" is not allowed to move the insert point backward to expand the selection of communication content made by "john_r". In other implementations, existing participants of a communication group may be allowed to either limit or expand the selection of communication content made by another participant without restrictions.

Figure 5K:
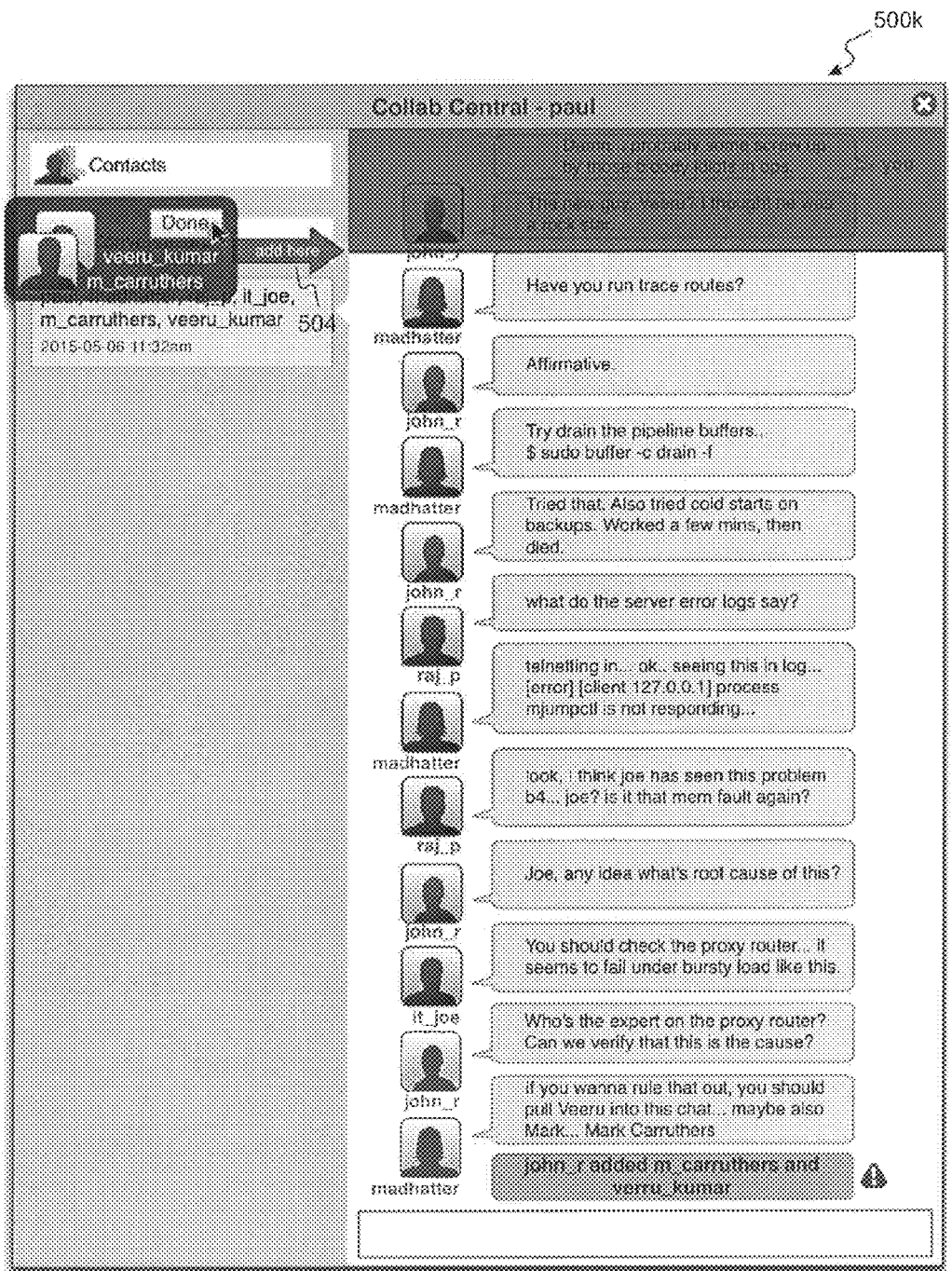

FIG. 5K shows another display 500k on the user device associated with "paul". As shown in FIG. 5K, "paul" moves the insert point 504 previously selected by "john_r" forward in the communication history to further limit the historical communication content provided to the new participants. Specifically, "paul" places the graphical icon representing "m_carruthers" and "veeru_kumar" at a point succeeding the comment "john_r" made about one of the new participants veeru. In doing so, "paul" intends that the comment "john_r" made about veeru is not provided to the new participants "m_carruthers" and "veeru_kumar", and messages posted afterwards would be provided to the new participants.

In some implementations, the communication server and/or the user device associated with "paul" may set a predetermined time limit for the existing participant to take an action after the prompt message is displayed. For example, if no indication is received within a predetermined time limit after sending an indication to the user device associated with "paul" inquiring whether certain communication content is acceptable, the communication server may determine the historical communication content for providing to the new participants without waiting for the feedback from "paul". As another example, the user device associated with "paul" may remove the prompt message on the display if no action is taken by "paul" within a predetermined time limit after the prompt message is displayed. In doing so, communication contents may be provided to the new participants without undue delay caused by inactions of some existing participants. The predetermined time limit may be configured for certain collaboration threads or be configured for all collaboration threads on a system wide basis. In some implementations, the predetermined time limit may be configured for selected participants in the group communication based on their roles. For example, the predetermined time limit may be configured for users who can participate in the group discussion, but may not be configured for the moderator who is the host of the communication session.

Figure 5L:
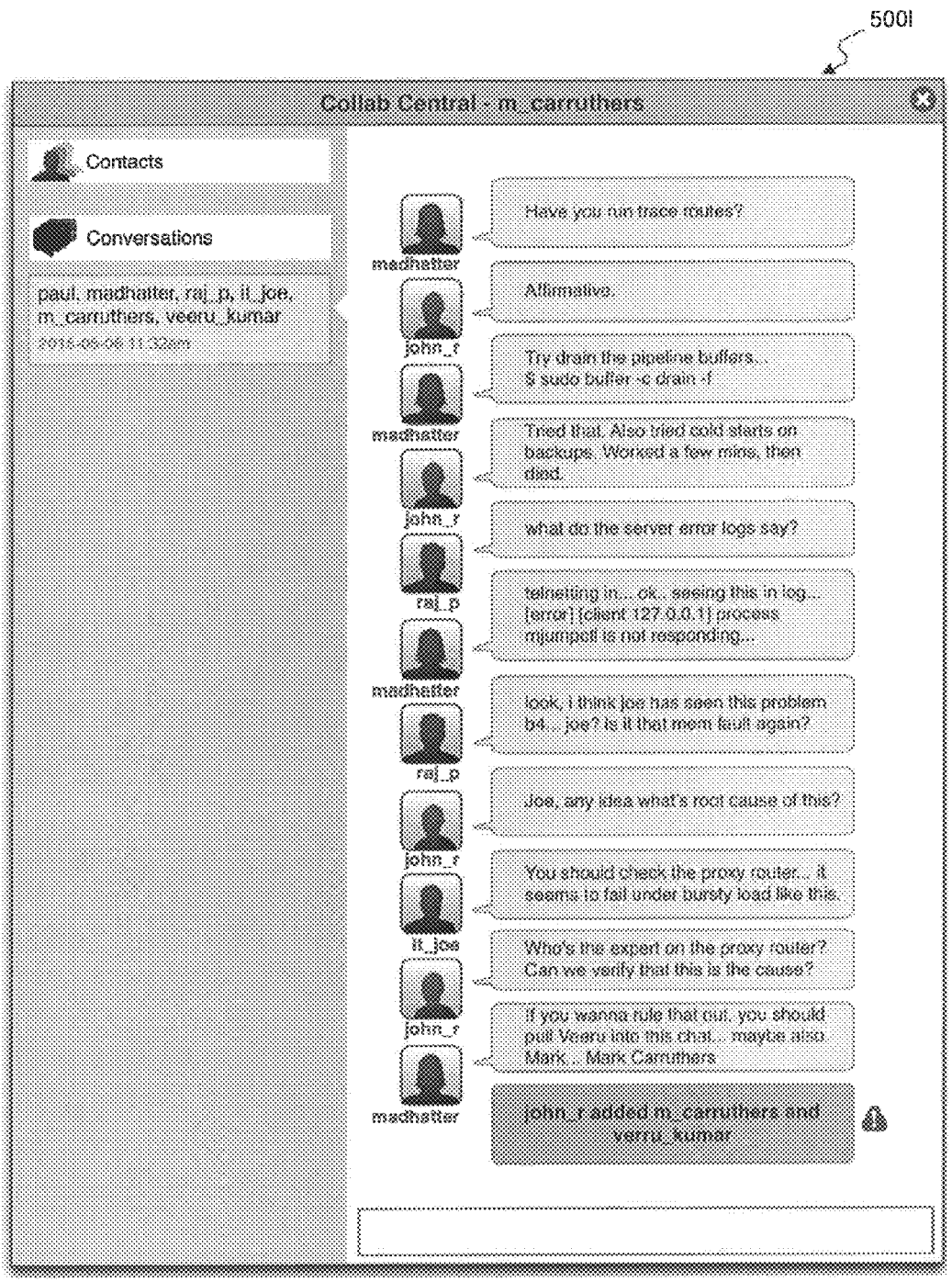

FIG. 5L shows another display 500l on the user device associated with the new participant "m_carruthers". Compared to FIG. 5H where no historical communication content is provided to "m_carruthers", the past communication history is now shown on the user device associated with "m_carruthers". As shown in FIG. 5L, the provided communication history includes messages posted after the insert point selected by "paul" in FIG. 5K, while messages posted before the insert point are not provided to the new participant "m_carruthers". In some embodiments, a notification may be sent to the existing participants "john_r," "paul," "madhatter," "raj_p," and "it_joe" that the past communication history is provided to the new participants "m_carruthers" and "veeru_kumar". The notification may also indicate the coverage of the past communication history that is provided to the new participants, such as the earliest time that communication was conducted in the provided content.

Figure 5M:
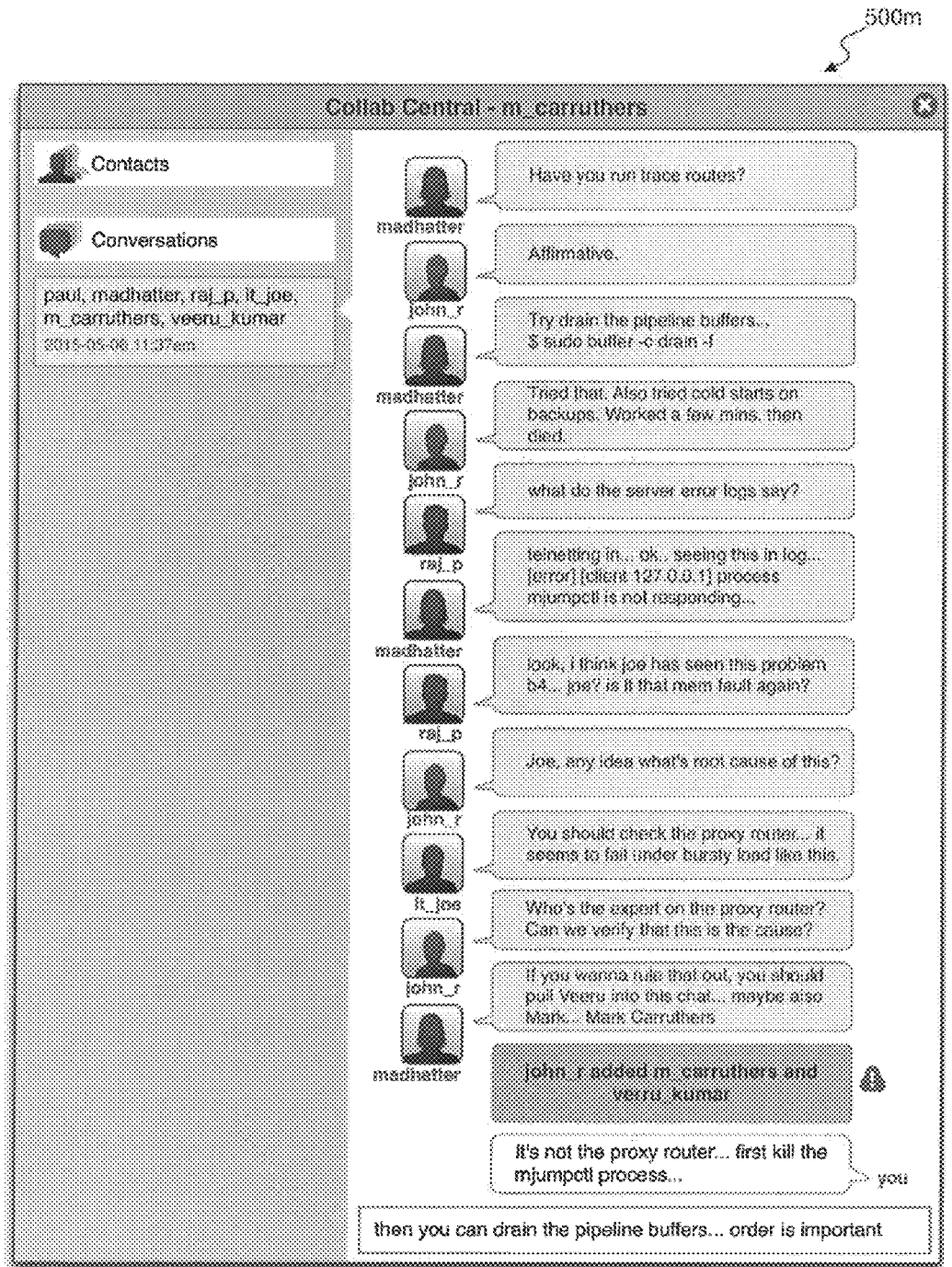

FIG. 5M shows another display 500m on the user device associated with the new participant "m_carruthers". As shown in FIG. 5M, after viewing the past communication history of the collaborative group, "m_carruthers" understands the issue in discussion and quickly provides his input in the collaborative thread, without having the existing participants in the group explain to him the communication context. By allowing existing participants in the group to select past communication content to provide to the new participants, productivity and efficiency of the collaborative group may be improved. Furthermore, privacy of the existing participants in the group may be preserved by providing the existing participants an option to review and modify another participant's selection of the past communication content.

While in the example illustrated in FIGS. 5A-5M, two new participants are added simultaneously to the collaborative group and provided with the same past communication history, in some implementations, the multiple participants who are added simultaneously in an existing communication group may be provided with different coverage of the past communication content. For example, two separate insert points may be provided for each of the two new participants "m_carruthers" and "veeru_kumar" in the display shown in FIG. 5F, and other existing participants may be provided with a user interface to modify the insert points for each of the two new participants separately. As another example, an end insert point may be provided in the display for the existing participants to select an end point in the past communication content for providing to the new participants.

Furthermore, in the above illustrated example, after the initial selection of past communication history by existing participant "john_r" in FIG. 5F, for simplicity of illustration, only the process of reviewing the selection made by existing participant "paul" is shown in the example. It is to be understood that other existing participants including "madhatter," "raj_p," "it_joe" may be provided a similar user interface to accept, deny, or review and modify the selection of past communication history made by existing participant "paul".

In addition, although an insert point is used in the above illustrated example for selecting the past communication history to provide to the new participants, other user interface elements may be used for selecting the past communication without departing from the scope of the present disclosure. For example, the existing participants may be provided with a user interface that allows the participants to select multiple contiguous or non-contiguous segments of the past communication history for providing to the new participants, for example by a selection gesture on a touchscreen display of the user device. As another example, the existing participants may be provided with a user interface that allows the participants to redact certain content in the past communication history for providing to the new participants. As another example, the existing participants may be provided with a user interface that allows the participants to mark certain content in the past communication history as private, and thus not providing the marked content to the new participants. As another example, the existing participants may be provided with a user interface that allows the participants to include or exclude past communication history based on identity of participants, such as include or exclude all messages posted by a particular participant. Moreover, in some implementations, the historical communication content not to be provided to the new participants may be presented to the new participants in marked-up pattern such that the content is unrecognizable by the new participants, while the historical communication content to be provided to the new participants may be presented to the new participants in a clean and viewable manner without any marked-up pattern.

Figure 6:
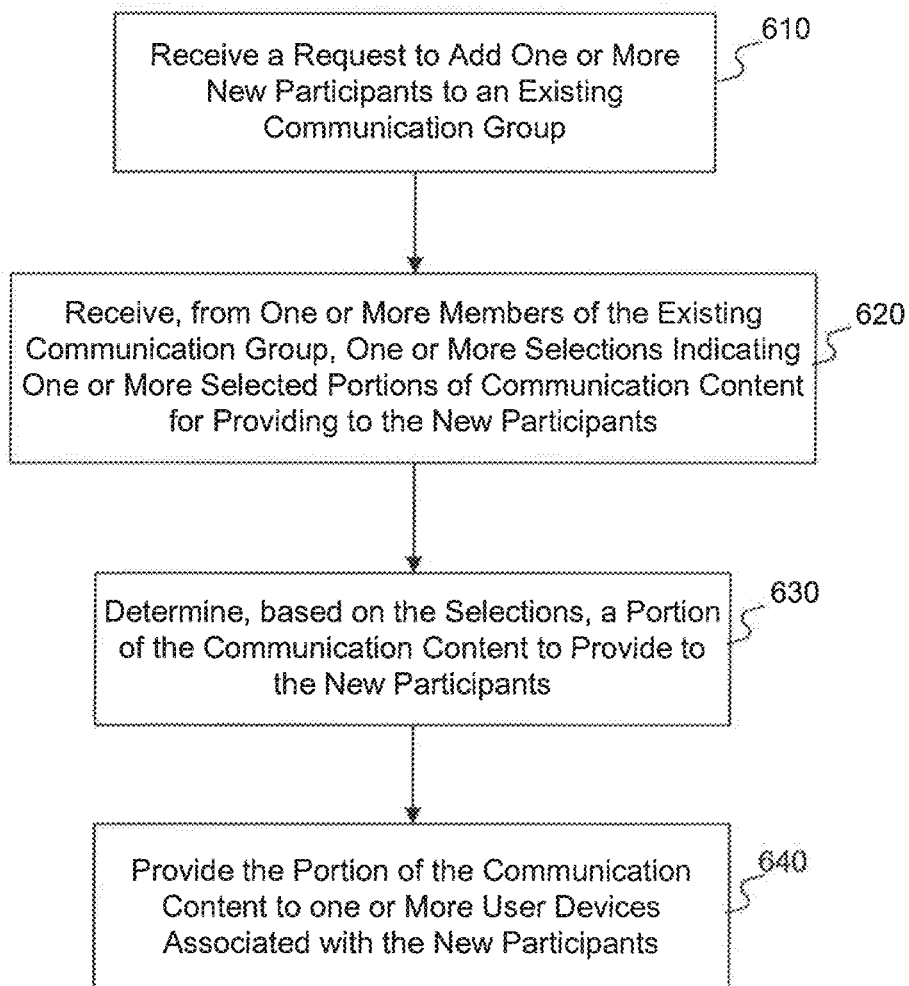
FIG. 6 is a flowchart of an example process for providing historical communication content to one or more new participants, in accordance with embodiments of the present disclosure.

FIG. 6 is a flowchart of an example process 600 for providing historical communication content to one or more new participants, in accordance with embodiments of the present disclosure. The steps associated with this example process may be performed by, for example, a processor of the communication server 150 of FIG. 1.

In step 610, the communication server receives a request to add one or more new participants to an existing communication group. The existing communication group may include a plurality of participants, and communication has been conducted among the participants of the existing communication group. For example, the request may be received from a user device associated with an existing participant of the existing communication group.

In step 620, the communication server receives, from one or more members of the existing communication group, one or more selections indicating one or more selected portions of communication content for providing to the one or more new participants, where the communication content includes communication between a plurality of participants of the existing communication group prior to the one or more new participants being added to the existing communication group. The communication content may include messages, emails, documents, audio/video files, and/or any other types of information exchanged among the participants of the communication group. For example, the communication server may receive an initial selection indicating a selected portion of the communication content to provide to the new participants from the participant who initiates the request to add the new participants. The communication server may then send an indication to other existing participants of the communication group inquiring whether the initial selected portion of the communication content is acceptable to provide to the new participants. Subsequently, the communication server may receive one or more other selections from other existing participants of the communication group indicating an acceptance, denial, or modification of the initial selection.

In step 630, the communication server determines, based on the one or more selections, a portion of the communication content to provide to the one or more new participants. For example, the communication server may determine the portion of the communication content to provide to the one or more new participants is an overlapping portion among the selected portions of communication content received from the existing participants. In some embodiments, the portion of the communication content to provide to the one or more new participants may include a file shared among the group participants, and the communication server may set a level of permission for the new participants to access the shared file according to request(s) received from the existing participants.

In step 640, the communication server provides the portion of the communication content to one or more user devices associated with the one or more new participants. The user devices associated with the new participants may provide a user interface displaying the received communication content to the new participants. In some embodiments, the new participants may be added to the existing communication group and participate in the group communication before the historical communication content is provided to them.

Figure 7:
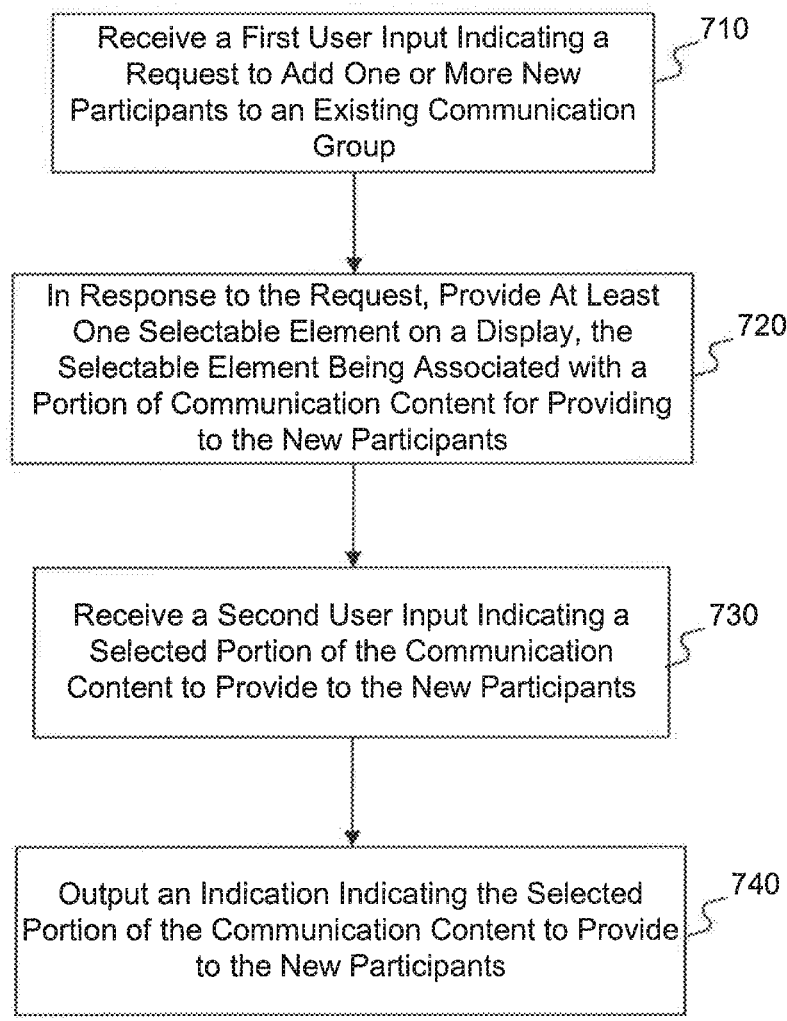
FIG. 7 is a flowchart of another example process for providing historical communication content to one or more new participants, in accordance with embodiments of the present disclosure.

FIG. 7 is a flowchart of another example process 700 for providing historical communication content to one or more new participants, in accordance with embodiments of the present disclosure. The steps associated with this example process may be performed by, for example, the user devices 120A-120E of FIG. 1.

In step 710, the user device receives a first user input indicating a request to add one or more new participants to an existing communication group. The existing communication group may include a plurality of participants, and communication has been conducted among the participants of the existing communication group. For example, the user device may be associated with an existing participant of the existing communication group. After receiving the first user input, the user device may send a request to an associated communication server requesting to add the new participants to the existing communication group.

In step 720, in response to the request to add the new participants, the user device provides at least one selectable element on the display, where the at least one selectable element is associated with a portion of communication content for providing to the one or more new participants. The communication content includes communication between a plurality of participants of the existing communication group prior to the one or more new participants being added to the existing communication group. For example, a position of the at least one selectable element on the display may indicate the portion of communication content for providing to the one or more new participants, where communication content displayed above the position of the at least one selectable element may not be provided to the new participants, and communication content displayed below the position of the at least one selectable element may be provided to the new participants.

In step 730, the user device receives a second user input indicating a selected portion of the communication content to provide to the one or more new participants. For example, the second user input may include a dragging action on the at least one selectable element which moves the at least one selectable element to a position of the display. The at least one selectable element may be moved to be within a display area where the communication content is displayed, and the position of the selectable element may indicate an earliest time entry of the communication content to be provided to the new participants. In some embodiments, the second user input may include a request to set a level of permission for the new participants to access a file included in the selected portion of communication content.

In step 740, the user device outputs an indication indicating the selected portion of the communication content to provide to the one or more new participants. For example, the indication may be a notification displayed on a screen of the user device. As another example, the indication may be a message output to the communication server 150. In some embodiments, after sending the indication, the user device may receive a notification that the selected portion of communication content is accepted, denied, or modified by a member of the existing communication group. The user device may also receive a notification that the one or more new participants are added to the existing communication group, which may be received prior to or after sending the message indicating the selected portion of the communication content.

Figure 8:
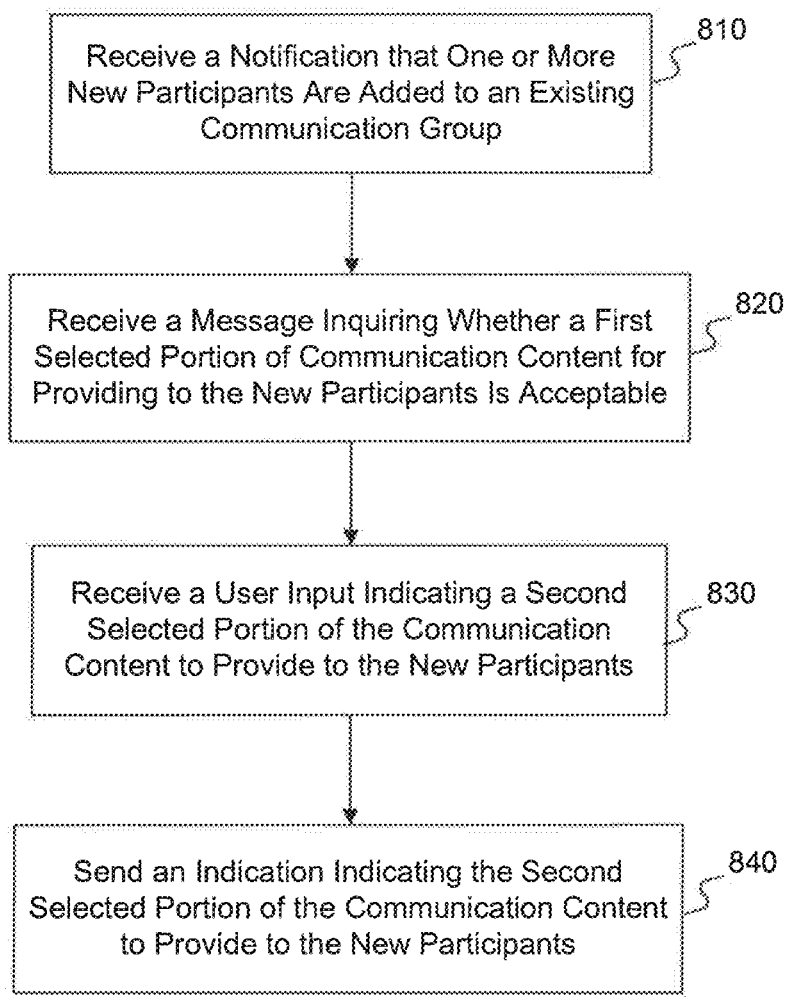
FIG. 8 is a flowchart of another example process for providing historical communication content to one or more new participants, in accordance with embodiments of the present disclosure.

FIG. 8 is a flowchart of another example process 800 for providing historical communication content to one or more new participants, in accordance with embodiments of the present disclosure. The steps associated with this example process may be performed by, for example, the user devices 120A-120E of FIG. 1.

In step 810, the user device receives a notification that one or more new participants are added to an existing communication group. The existing communication group may include a plurality of participants, and communication has been conducted among the participants of the existing communication group. For example, the user device may be associated with an existing participant of the existing communication group. The notification may be received from, for example, the communication server 150.

In step 820, the user device receives an indication inquiring whether a first selected portion of communication content for providing to the one or more new participants is acceptable, where the communication content includes communication between a plurality of participants of the existing communication group prior to the one or more new participants being added to the existing communication group. For example, the user device may display the indication and request the existing participant associated with the user device to approve, deny (or reject), or review and modify the first selected portion of communication content.

In step 830, the user device receives a user input indicating a second selected portion of the communication content for providing to the one or more new participants. The user input may be entered by the existing participant associated with the user device. For example, the second selected portion of the communication content may include a less amount of content than the first selected portion of the communication content. As another example, the second selected portion of the communication content may include the same content as the first selected portion of the communication content. In some embodiments, the second selected portion of the communication content may include a plurality of non-contiguous segments of the communication content. The second selected portion of the communication content may include a file shared among a plurality of participants of the existing communication group, and the user input may set a level of permission for the new participants to access the file.

In step 840, the user device sends an indication indicating the second selected portion of the communication content to provide to the one or more new participants. For example, the indication may be a message or notification sent to the communication server 150. In some embodiments, the new participants may be provided with a portion of the communication content which is included in both the first selected portion of the communication content and the second selected portion of the communication content. In other words, the new participants may be provided with an overlapping portion of the communication content between the first selected portion of the communication content and the second selected portion of the communication content. In some embodiments, the user device may receive another notification notifying that the portion of the communication content is provided to the new participants.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A communication server, comprising:
    at least one network interface; and
    at least one processor in communication with the network interface and configured to:
    receive a request to add one or more new participants to a communication group from a first participant of the communication group;
    receive, from one or more members of the communication group, one or more selections indicating one or more selected portions of communication content for providing to the one or more new participants, wherein the communication content includes information transferred between a plurality of participants of the communication group prior to the one or more new participants being added to the communication group, and wherein receiving the one or more selections comprises receiving, from the first participant, a first selected portion of the communication content for providing to the one or more new participants after receiving the request to add the one or more new participants;
    determine, based on the one or more selections, a portion of the communication content for providing to the one or more new participants; and
    provide the portion of the communication content to one or more user devices associated with the one or more new participants.

2. The communication server of claim 1, wherein the at least one processor is further configured to:
    send an indication to the one or more members of the communication group inquiring whether the first selected portion of the communication content is acceptable.

3. The communication server of claim 2, wherein the one or more selected portions of communication content includes a modification to the first selected portion of the communication content.

4. The communication server of claim 1, wherein the portion of the communication content for providing to the one or more new participants is an overlapping portion among the one or more selected portions of communication content.

5. The communication server of claim 1, wherein the at least one processor is further configured to: prior to providing the portion of the communication content to the one or more user devices, add the one or more new participants to the communication group for interacting with the plurality of participants.

6. The communication server of claim 1, wherein the portion of the communication content includes a plurality of non-contiguous segments of the communication content.

7. The communication server of claim 1, wherein the portion of the communication content includes a file shared among the plurality of participants, and the at least one processor is further configured to set a level of permission for the one or more new participants to access the file.

8. A user device, comprising:
    a display; and
    at least one processor configured to:
    receive a first user input indicating a request to add one or more new participants to a communication group;
    in response to the request, provide at least one selectable element on the display, the at least one selectable element being associated with a portion of communication content for providing to the one or more new participants, wherein the communication content includes information transferred between a plurality of participants of the communication group prior to the one or more new participants being added to the communication group;
    receive a second user input indicating a selected portion of the communication content for providing to the one or more new participants, wherein the second user input includes a dragging action on the at least one selectable element, the dragging action moves the at least one selectable element to a position of the display, and the position of the display indicates an earliest time entry of the communication content to be provided to the one or more new participants; and
    output an indication indicating the selected portion of the communication content for providing to the one or more new participants.

9. The user device of claim 8, wherein a position of the at least one selectable element on the display indicates the portion of communication content for providing to the one or more new participants.

10. The user device of claim 8, wherein the at least one processor is further configured to receive a notification that the one or more new participants are added to the communication group.

11. The user device of claim 8, wherein the at least one processor is further configured to receive a notification that the selected portion of communication content is modified by a member of the communication group.

12. The user device of claim 8, wherein the second user input includes a request to set a level of permission for the one or more new participants to access a file included in the selected portion of communication content.

13. A user device, comprising:
    at least one communication interface; and
    at least one processor in communication with the communication interface and configured to:
    receive, via the at least one communication interface, a notification that one or more new participants are added to a communication group;
    receive, via the at least one communication interface, an indication inquiring whether a first selected portion of communication content for providing to the one or more new participants is acceptable, wherein the communication content includes information transferred between a plurality of participants of the communication group prior to the one or more new participants being added to the communication group;
    receive a user input indicating a second selected portion of the communication content for providing to the one or more new participants, wherein the second selected portion of the communication content includes a file shared among a plurality of participants of the communication group; and
    send, via the at least one communication interface, an indication indicating the second selected portion of the communication content for providing to the one or more new participants.

14. The user device of claim 13, wherein the second selected portion of the communication content includes a less amount of content than the first selected portion of the communication content.

15. The user device of claim 13, wherein the second selected portion of the communication content includes a plurality of non-contiguous segments of the communication content.

16. The user device of claim 13, wherein the user input sets a level of permission for the one or more new participants to access the file.

17. The user device of claim 13, wherein the one or more new participants are provided with a portion of the communication content, the portion of the communication content being included in both the first selected portion of the communication content and the second selected portion of the communication content.

18. The user device of claim 17, wherein the at least one processor is further configured to receive, via the at least one communication interface, another notification that the portion of the communication content is provided to the one or more new participants.

* * * * *